(12) United States Patent
Manning

(10) Patent No.: US 11,905,006 B2
(45) Date of Patent: Feb. 20, 2024

(54) MULTI-ROTOR AIRCRAFT AND RELATED SYSTEMS AND METHODS

(71) Applicant: Electrafly, LLC, North Salt Lake, UT (US)

(72) Inventor: John G. Manning, North Salt Lake, UT (US)

(73) Assignee: ELECTRAFLY, LLC, North Salt Lake, UT (US)

( * ) Notice: Subject to any disclaimer, the term of this patent is extended or adjusted under 35 U.S.C. 154(b) by 1290 days.

(21) Appl. No.: 16/436,424

(22) Filed: Jun. 10, 2019

(65) Prior Publication Data

US 2019/0291859 A1    Sep. 26, 2019

Related U.S. Application Data

(63) Continuation of application No. PCT/US2018/020986, filed on Mar. 5, 2018.

(60) Provisional application No. 62/502,765, filed on May 8, 2017, provisional application No. 62/467,094, filed on Mar. 4, 2017.

(51) Int. Cl.
  *B64C 29/00* (2006.01)
  *B64C 39/02* (2023.01)
  *B64C 27/52* (2006.01)
  *B64D 27/24* (2006.01)
  *B64C 3/38* (2006.01)
  *B64D 27/02* (2006.01)

(52) U.S. Cl.
  CPC .......... *B64C 29/0033* (2013.01); *B64C 3/385* (2013.01); *B64C 27/52* (2013.01); *B64C 29/0075* (2013.01); *B64C 39/026* (2013.01); *B64D 27/24* (2013.01); *B64D 2027/026* (2013.01)

(58) Field of Classification Search
  CPC ...... B64C 27/52; B64C 29/0033; B64C 27/22
  See application file for complete search history.

(56) References Cited

U.S. PATENT DOCUMENTS 3,053,480 A    9/1962    Vanderlip
8,128,019 B2   3/2012    Annati et al.
(Continued)

FOREIGN PATENT DOCUMENTS

CN    110422326 A  * 11/2019
EP    3116781         1/2017
(Continued)

OTHER PUBLICATIONS

Extended European Search Report dated Nov. 23, 2020 for EP application 18764943.9.
(Continued)

*Primary Examiner* — Magdalena Topolski
(74) *Attorney, Agent, or Firm* — Stoel Rives LLP

(57) ABSTRACT

An aircraft can include a frame and a plurality of electrical rotors coupled to the frame. The aircraft can further include a control system physically coupled to the frame and communicatively coupled with each of the plurality of electrical rotors. The control system can be configured to control a speed of each electrical rotor on an individual basis to control a direction of flight of the aircraft. The aircraft can further include an engine coupled to the frame, the engine being configured to combust a combustible fuel to generate thrust.

17 Claims, 31 Drawing Sheets

(56) References Cited

U.S. PATENT DOCUMENTS

| | | | |
|---|---|---|---|
| 8,453,962 | B2 | 6/2013 | Shaw |
| 9,120,560 | B1 * | 9/2015 | Armer et al. |
| 10,807,707 | B1 * | 10/2020 | Ter Keurs ............... B64C 17/02 |
| 11,254,430 | B2 * | 2/2022 | Regev .................... B64C 27/20 |
| 11,579,604 | B2 * | 2/2023 | Regev .................... G05D 1/0033 |
| 11,635,773 | B2 * | 4/2023 | Anishchenko .......... B64C 9/323 |
| | | | 244/17.17 |
| 2013/0062455 | A1 | 3/2013 | Lugg et al. |
| 2016/0376005 | A1 | 12/2016 | Phan et al. |
| 2017/0015412 | A1 | 1/2017 | Matus |

FOREIGN PATENT DOCUMENTS

| | | |
|---|---|---|
| EP | 3116781 A1 | 1/2017 |
| WO | 2016016889 A1 | 2/2016 |
| WO | 2016035068 | 3/2016 |
| WO | 2016035068 A2 | 3/2016 |
| WO | 2016179667 | 11/2016 |
| WO | 2016179667 A1 | 11/2016 |
| WO | WO-2019005467 A2 * | 1/2019 .............. B62M 9/00 |

OTHER PUBLICATIONS

International Search Report and Written Opinion dated May 24, 2018 for international application PCT/US2018/020986.

* cited by examiner

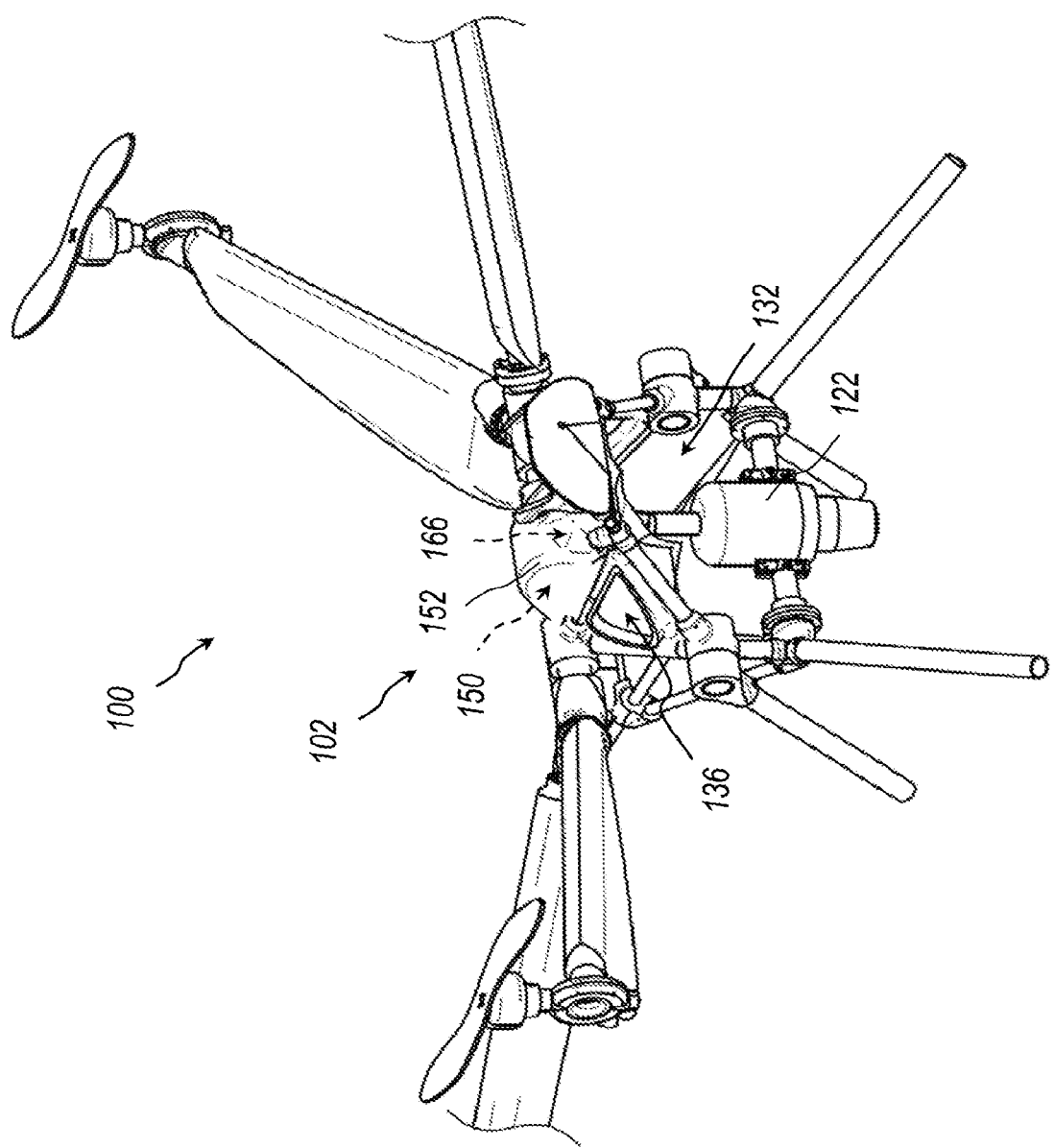

MULTI-ROTOR AIRCRAFT AND RELATED SYSTEMS AND METHODS

CROSS-REFERENCE TO RELATED APPLICATIONS

This application is a continuation of International Application No. PCT/US2018/020986, filed Mar. 5, 2018 and titled MULTI-ROTOR AIRCRAFT AND RELATED SYSTEMS AND METHODS, which claims priority to U.S. Provisional Application No. 62/502,765, filed Mar. 8, 2017 and titled MULTICOPTERS AND RELATED SYSTEMS AND METHODS, and also claims priority to U.S. Provisional Application No. 62/467,094, filed Mar. 4, 2017 and titled MULTICOPTERS AND RELATED SYSTEMS AND METHODS, each of which is incorporated herein by reference in its entirety.

BACKGROUND

The present disclosure relates to aircraft, and relates more particularly to multi-rotor aircraft, such as multicopters.

BRIEF DESCRIPTION OF THE DRAWINGS

The written disclosure herein describes illustrative embodiments that are nonlimiting and non-exhaustive. Reference is made to certain of such illustrative embodiments that are depicted in the figures, in which:

FIG. 4 is another perspective view of the multi-rotor aircraft of FIG. 1;

DETAILED DESCRIPTION

Figure 1:
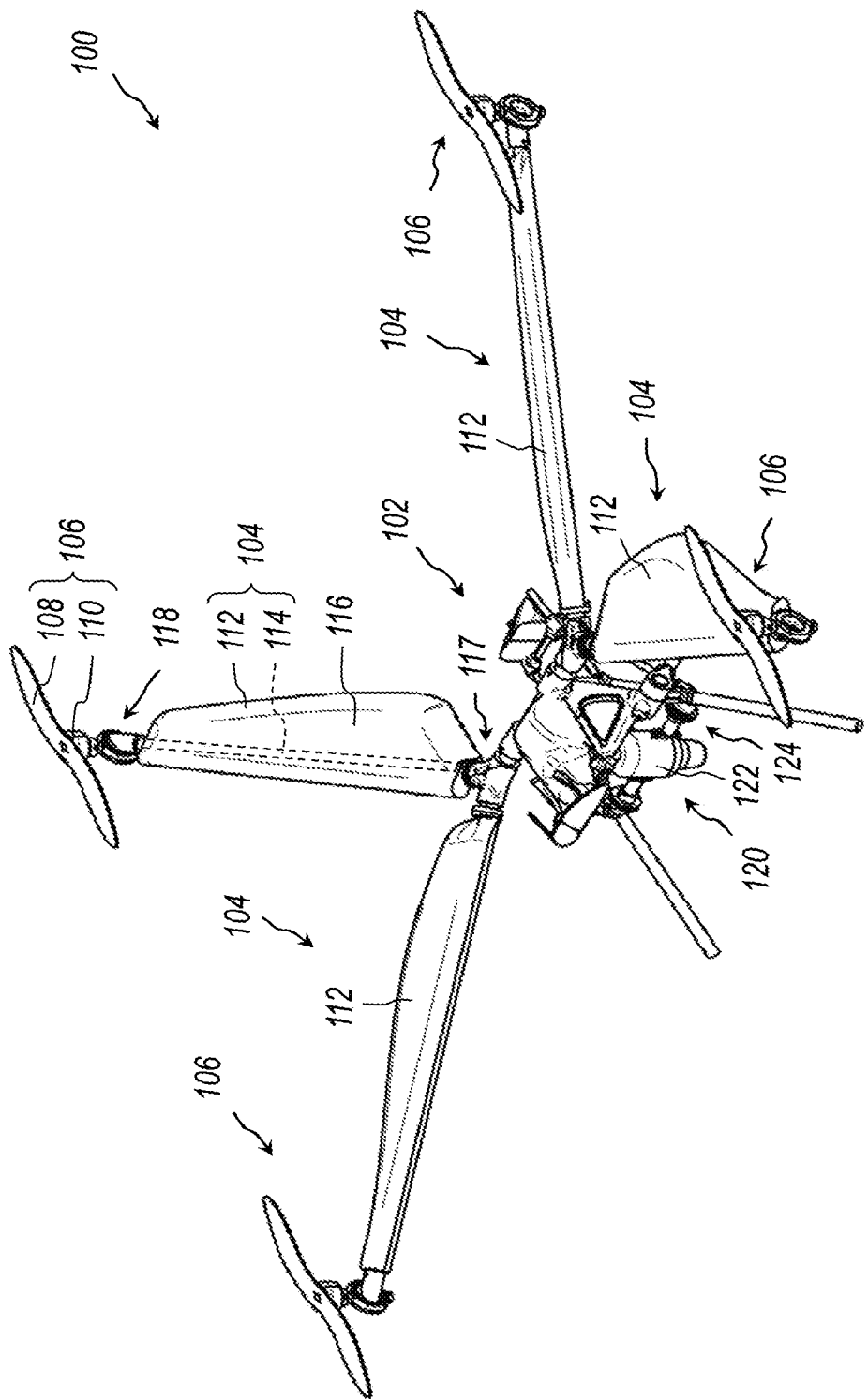
FIG. 1 is a perspective view of an embodiment of multi-rotor aircraft.

Multicopter aircraft have traditionally been made without wings. Further, such aircraft are devoid of other features designed to produce significant supplemental lift, such as, for example, when an aircraft hovers and/or travels in a forward direction. As a result, the entire weight, or substantially the entire weight, of the aircraft is supported by the propellers throughout all phases of flight.

As used herein, the term "multicopter" refers to aircraft that include a plurality of rotors. Traditionally, the term "multicopter" has been used to describe aircraft for which lift is derived from the aerodynamic forces acting on a plurality of powered rotors turning about fixed, substantially vertical (relative to the aircraft) axes. Such multicopters generally include flight controllers that control the speed of the rotors, individually, to variably control, inter alia, a direction of flight of the aircraft. Stated otherwise, for such aircraft, the rotors act as both the exclusive lift generators and the exclusive control surfaces. The term "multicopter," as used herein and in the priority documents identified above, may at times refer to such traditional multicopters, and may at other times refer to arrangements that resemble traditional multicopters in many respects, but have different properties therefrom and may not fit entirely within the traditional definition of this term.

In order to avoid confusion, the term "traditional multicopter" will be used hereafter to describe typical multicopter aircraft that have a plurality of rotors that each have a generally vertical (relative to the aircraft) fixed axis of rotation, that are each controlled individually so as to control a variable direction of flight of the aircraft, and that collectively and exclusively provide the total lift and the entirety of the control surfaces of the aircraft. The more general term "multicopter," in the absence of the qualifier "traditional," is a broader term that encompasses not only traditional multicopters, as just defined, but also aircraft that have different, other, and/or further properties, such as, by way of example and not limitation, rotors that have axes of rotation that may be capable of being rotated relative to the aircraft, rotors (whether fixed or movable) having axes of rotation that are non-vertical relative to the aircraft, control surface in addition to those of the rotors, and/or mechanisms for supplementing the lift provided by the rotors. The term "multirotor aircraft" is also a broad term that may be used herein to describe a variety of aircraft that include a plurality of rotors.

Traditional multicopters rely solely on battery power to achieve flight. Accordingly, these prior aircraft are lofted solely by electrically produced thrust. Due to various inherent limitations of batteries (e.g., energy density, total capacity), the flight times of such multicopters are fairly limited, as are the size of payloads that can be carried by the multicopters.

Embodiments disclosed herein ameliorate, remedy, or avoid one or more of the foregoing drawbacks of traditional multicopters. For example, certain embodiments include endurance and/or weight capacity improvements for multirotor aircraft. Some embodiments include hingable, rotatable, and/or tiltable pitch-adjusting wings. Other or further embodiments include rotor assemblies that are configured to reorient axes of rotation of the rotors relative to the aircraft. Other or further embodiments include hingable, rotatable, and/or tiltable propulsion systems, and in particular instances, the propulsion systems are powered by energy-dense combustible hydrocarbon fuel. Still other or further embodiments include a combustible fuel system to augment the use of electrical power, as battery capacity as a function of available energy within the battery can be far lower than the amount of energy within an equivalent weight of combustible fuel. One or more of the foregoing advantages can increase a range of a multicopter and/or increase a load that may be borne by the multicopter. One or more of these and/or other or further advantages of embodiments discussed herein will be apparent from the present disclosure.

With reference to FIG. 1, in certain embodiments, a multi-rotor aircraft 100 includes a fuselage 102 and a plurality of arms 104 that extend outwardly relative thereto. The fuselage 102 can be configured to carry any type, size, or configuration of payload, as desired or as designed. In the illustrated embodiment, the fuselage 102 is configured so as to be particularly well suited to accommodate a rider thereon, as described further below. Accordingly, much of the present disclosure is cast in the context of passenger flight. In other embodiments, however, the fuselage 102 can be configured for transporting any desired form of payload. For example, in some embodiments, the fuselage 102 is specifically configured for carrying one or more packages or similar cargo (e.g., for drone delivery). In other embodiments, the fuselage 102 is configured for carrying a camera or other equipment, which may be securely mounted onboard. In still other embodiments, the multi-rotor aircraft 100 may not necessarily be configured to carry a payload, and may instead merely benefit from the increased flight times. The term "fuselage" is used broadly and can include a frame, body, central region, or any other or further structure from which the arms 104 project, regardless of a size or amount of payload that may or may not be carried thereby. Any other suitable payload or fuselage or arrangement is contemplated. More generally, the present disclosure includes multiple inventions, one or more of which may advantageously be applied to a wide or full range of multi-rotor aircraft.

The plurality of arms 104 can be coupled with the fuselage 102 in any suitable manner. In the illustrated embodiment, a portion of each arm 104 is fixedly secured to the fuselage 102 such that a longitudinal axis of each arm 104 generally defines a fixed angular orientation relative to the fuselage 102. In other embodiments (see, e.g., FIG. 16 and associated description), the arms 104 may be secured to the fuselage 102 such that a longitudinal axis of each arm 104 is selectively movable relative to the fuselage 102. For example, as further discussed below, one or more of the arms 104 may be configured to be selectively deployed (e.g., rotated, pivoted, unfolded, or otherwise expanded) into a high-profile, flight orientation, such as that shown in FIG. 1. The arms 104 may further be selectively retracted (e.g., rotated, pivoted, folded, or otherwise collapsed) into a low-profile, stowed orientation for storage or the like. Any other suitable arrangement or mechanism for coupling the arms 104 with the fuselage 102 is contemplated.

The illustrated multi-rotor aircraft 100 further includes a plurality of rotors 106. Each rotor 106 is secured to a separate arm 104. In particular, in the illustrated embodiment, the rotors 106 are secured to the distal ends of the arms 104. The rotors 106 may also be referred to herein as rotor assemblies. The rotors 106, or rotor assemblies, can each include a rotor blade 108 that is configured to rotate about a rotor axis to provide lift, and can further include an electrical motor 110 coupled to the rotor blade 108 to achieve rotation of the rotor blade (see also FIG. 9 and accompanying description). The rotor blades 108 are depicted somewhat schematically in FIGS. 1-6, as the blades 108 are shown in substantially planar form. The blades 108 can generally include any suitable airfoil configuration that can generate lift as the rotor blades 108 are rotated.

With continued reference to FIG. 1, in the illustrated embodiment, each arm 104 includes a wing 112 and a spar 114. Each wing 112 can include an airfoil 116 to achieve lift. The airfoil 116 may be of any suitable variety and/or may comprise any of a variety of different components having a lift-generating configuration. Accordingly, the airfoil 116 can also be referred to as a wing body, skin, cover, shell, etc. Stated otherwise, each wing 112 can include an external surface that is shaped so as to provide lift when air passes over it. The wing 112 can be coupled with the fuselage 102 in any suitable manner. In the illustrated embodiment, each wing 112 is movably connected to the spar 114 so as to be able to rotate or pivot relative thereto. Stated otherwise, a pitch of the wing 112 can be adjustable and/or controllable.

Figure 2:
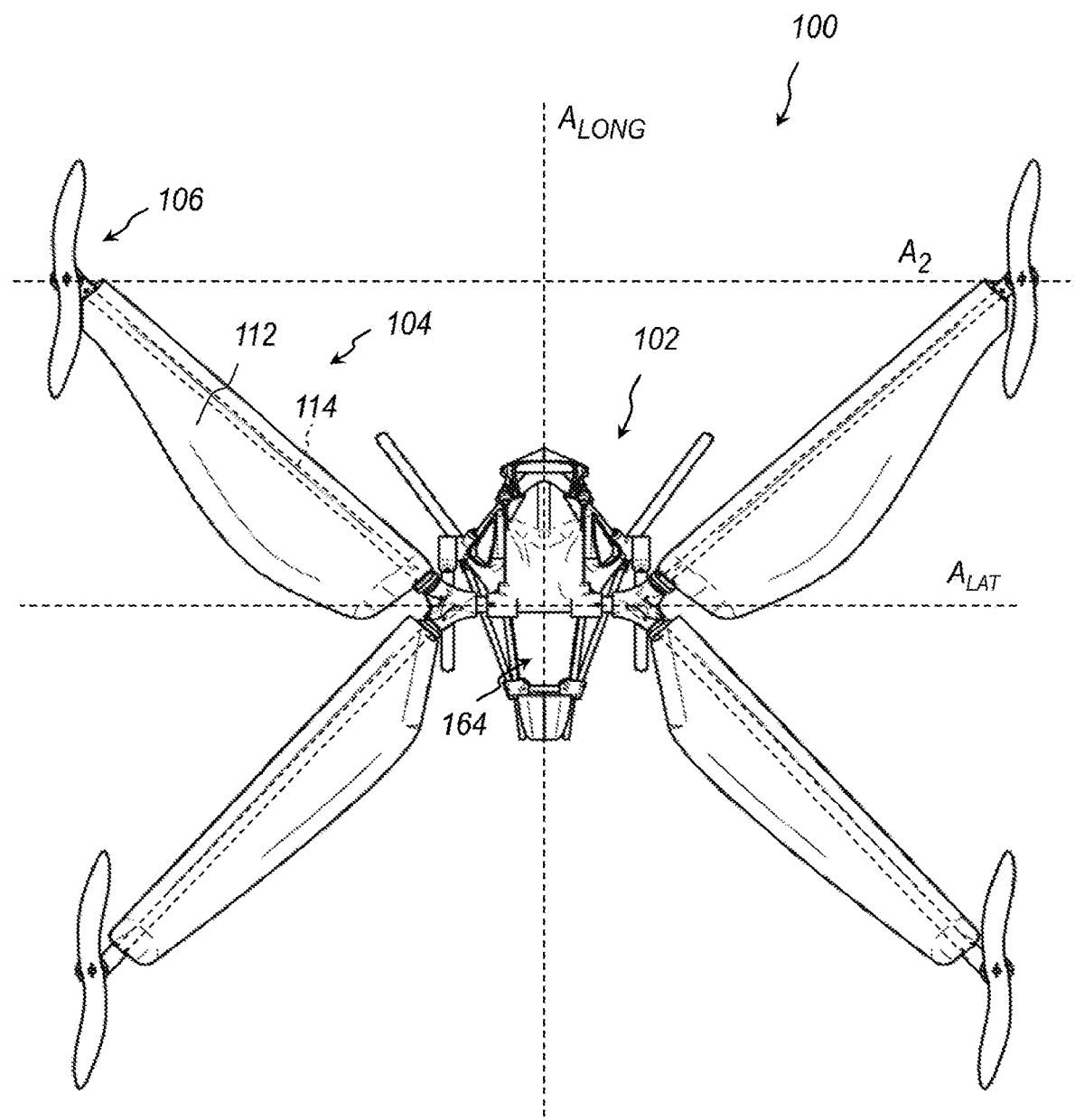
FIG. 2 is a top plan view of the multi-rotor aircraft of FIG. 1.

With reference to FIG. 2, the illustrated wings 112 have an irregular outer profile, as viewed from above. That is, rather than defining a generally triangular, trapezoidal, rectangular profile, the wings 112 include enlarged regions near the fuselage that taper in a non-linear manner toward the distal ends thereof. For the front wings 112, the taper is more curved and more pronounced, as compared with the rear wings 112. Stated otherwise, a trailing edge of each wing 112 is curved. Moreover, for the front wings, the curvature transitions from convex to concave, in the distal direction.

In some instances, the inner, inboard, or proximal ends of the wings 112 can be shaped so as to prevent interference between the front and rear (forward and aft) wings 112 as they rotate. For example, as further discussed below, the illustrated wings 112 are rotatable about the spars 114 between a substantially vertical configuration (see FIG. 12A) and a substantially horizontal configuration, which is shown in FIG. 2 (see also FIG. 12B). The inboard, inner, or proximal ends of the wings 112 may be sufficiently tapered or otherwise shaped such that the wings 112 do not contact each other during such rotation and/or when the wings 112 are in the generally horizontal configuration. Any other suitable configuration of the wings 112 is contemplated.

Figure 12A:
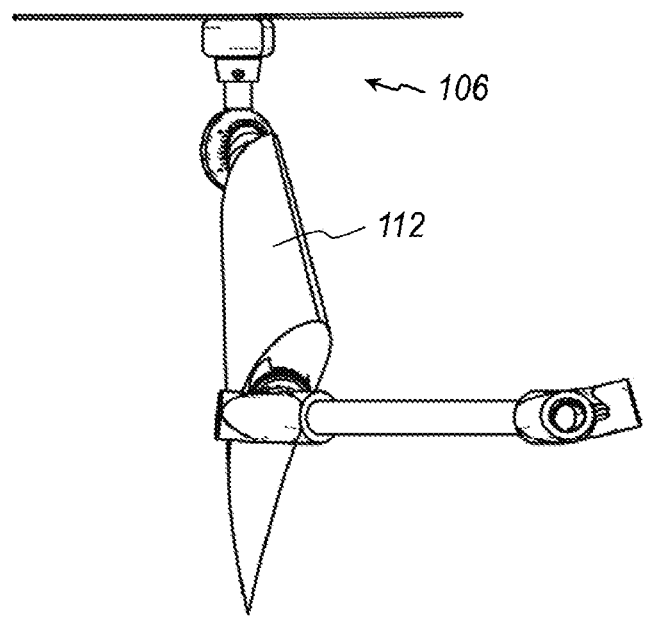
FIG. 12A is a perspective view of an embodiment of an arm, which includes a pitch-adjustable wing, and a pitch-adjustable rotor mounted to an end of the arm, during upward flight.
Figure 12B:
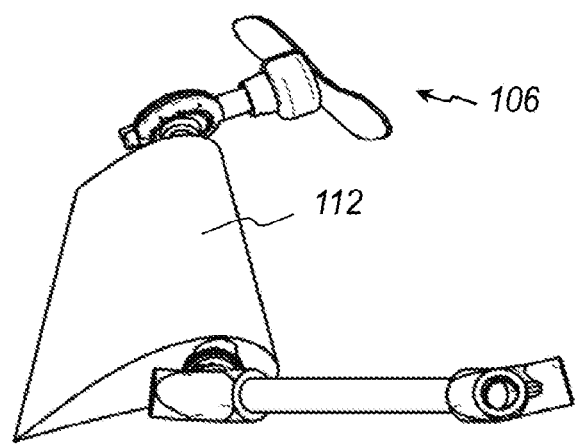
FIG. 12B is another perspective view of the arm and the rotor during high-speed forward flight.
Figure 15:
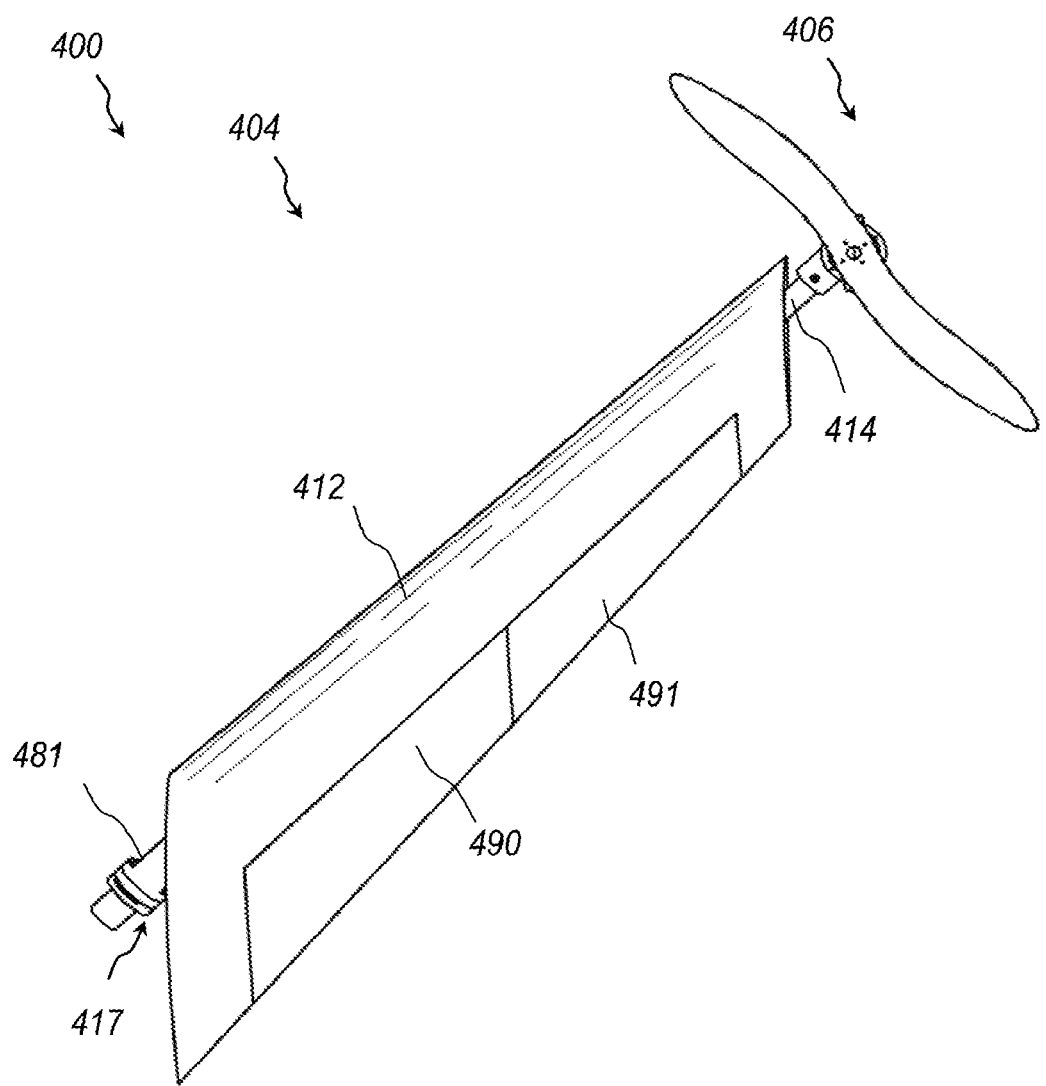
FIG. 15 is a top plan view of a portion of another embodiment of a multi-rotor aircraft, wherein a starboard forward arm and a rotor coupled thereto are depicted.

An example of a different wing profile is shown in FIGS. 12A and 12B. In this embodiment, the outer profile is substantially rectangular (which appears quite tapered in the perspective view of FIG. 12B). The wing may, in other instances, taper in the distal direction so as to be substantially trapezoidal. Another illustrative example, which is discussed further below, is shown in FIG. 15. The leading and trailing edges of the wing depicted in FIG. 15 are generally straight, similar to those in FIGS. 12A and 12B, but the narrowing taper between these edges, in the distal direction, is more pronounced for the wing of FIG. 15. Again, such wing shapes are merely illustrative, as a wide variety of wing configurations are possible.

With reference to FIGS. 1 and 2, the spars 114 of each arm 104 are connected to the fuselage 102 via arm mounting assemblies 117, which are discussed in further detail below. In the illustrated embodiment, each arm mounting assembly 117 couples two arms 104 with the fuselage 102. The spars 114 can be fixedly secured to the fuselage 102 so as not to rotate relative thereto, whether about a longitudinal axis of a given spar 114 or wither about any axis that is perpendicular to said longitudinal axis of a given spar 114. In some embodiments, the wings 112 are fixedly secured to the spars 114, and thus likewise do not rotate. However, in other embodiments, the wings 112 can rotate about the spars 114. For example, in some embodiments, the wings 112 are mounted in a free-wing arrangement and can passively rotate about the spars 114 in manners discussed hereafter. In other embodiments, an angle of the wings can be selectively adjusted, such as via manual or mechanical manipulation. In still other or further embodiments, an angle of the wings 112 can be controlled via electromechanical apparatus.

With continued reference to FIGS. 1 and 2, in the illustrated embodiment, each wing 112 encompasses and is connected to a separate spar 114. For the sake of clarity, only one spar 114 is shown extending through one of the wings 112 in FIG. 1. As further discussed below, the wings 112 can be pivotally or rotationally coupled to the spars 114, in some embodiments.

The spar 114 may also be referred to as a support, strut, rail, elongated member, etc. The spar 114 can provide structural rigidity to the wing 112. The spar 114 can extend outwardly, or in an outboard direction, from the fuselage 102 in a predefined direction. The spars 114 of the illustrated embodiment are arranged in a substantially X-shaped configuration, as viewed from above, as shown in FIG. 2. In particular, in the top plan view of FIG. 2, the forward arms extend outwardly and forward from the fuselage 102, whereas to aft arms extend outwardly and rearward from the fuselage. More generally, the arms 104 may be said to define an X-shape, as viewed from above.

In other embodiments, the spars 114, or the arms 104, may instead be positioned in a substantially I-shaped or H-shaped configuration. For example, the forward spars 114 may be substantially collinear with each other and may extend transversely (e.g., orthogonally) to a longitudinal axis of the aircraft 100. The aft spars 114 may similarly be substantially collinear with each other and may also extend transversely (e.g., orthogonally) to the longitudinal axis of the aircraft 100. The forward and aft spars 114 may be sufficiently far apart such that, in combination with the fuselage 102, the aircraft 100 generally resembles the shape of an "H" or an "I", as viewed from above. In some instances, such a frame can be advantageous, as wings may be positioned in a manner similar to traditional aircraft. In still other embodiments, one of the sets of forward or aft wings 104 may be substantially straight or collinear, whereas the other of the sets of forward or aft wings 104 may be substantially angled (forwardly or rearwardly, respectively), as viewed from above, as in the X-shape previously described.

The spars 114 can take any suitable shape or form, and can provide structural strength or rigidity to, or otherwise support or assist in the mounting of the airfoils 116. In the illustrated embodiment, the spars 114 are rigid hollow tubes (e.g., comprising any suitable strong, lightweight material-aluminum, plastic, composite, etc.). The spars 114 may define passageways through which wiring or the like may be routed.

With reference to FIGS. 1 and 2, the rotors 106 can be coupled with the arms 104 in any suitable manner. The rotors 106 may, in particular, be positioned distally relative to the arms 104. Stated otherwise, each rotor 106 may be mounted to an arm 104 at a position that is further from the fuselage 102 than is a distal end of the wing 112 associated with that arm 104. In the illustrated embodiment, the rotors 106 are attached to the extreme distal ends—that is, at distal tips—of the arms 104, whereas the wings 112 are at intermediate regions of the arms.

Each rotor 106 can be attached to the arms 104 via a rotor mounting assembly 118. A variety of configurations for the rotor mounting assembly 118 are contemplated, some of which are discussed in greater detail below (e.g., with respect to FIGS. 8-10).

Various implementations of the rotor mounting assembly 118 can achieve, for example, an angularly fixed, a manually or mechanically angularly adjustable, or a dynamically or electromechanically angularly adjustable relationship between an axis of rotation $A_1$ of the rotor blades 108 (see FIG. 8) and the aircraft 100. For example, the aircraft 100 can define mutually orthogonal longitudinal, lateral, and vertical axes ALONG, $A_{LAT}$, $A_{VERT}$ (see FIGS. 2 and 5A), as these terms are commonly understood for aircraft. It may also be said, more specifically, that the fuselage 102 defines the longitudinal, lateral, and vertical axes ALONG, $A_{LAT}$, $A_{VERT}$. The axis of rotation $A_1$ of each rotor 106 (see FIG. 8) can be parallel or substantially parallel to the vertical axis $A_{VERT}$ of the aircraft 100, or may otherwise define a fixed angle relative the vertical axis $A_{VERT}$. In other or further instances, the axis of rotation $A_1$ of each rotor 106 may be selectively adjustable relative to the vertical axis $A_{VERT}$ (e.g., via manual, mechanical, or electromechanical manipulation). For example, the rotor mounting assembly 118 can permit rotation of the rotor 106, relative to the aircraft 100, about an axis $A_2$ that is orthogonal to the axis of $A_1$ (see FIG. 8). As shown in FIG. 2, the axis $A_2$ can be parallel to the lateral axis $A_{LAT}$ of the aircraft 100. In other or further instances, the axis of rotation $A_1$ of each rotor 106 may be dynamically adjustable about the axis $A_2$ (e.g., via electromechanical controls), such as during flight.

As previously mentioned, in some embodiments, the rotor mounting assembly 118 can mount the rotors 106 to the arms 104 such that the rotational axis $A_1$ of each rotor 106 is fixed relative to the aircraft 100. In some embodiments, the rotors 106 are fixed such that their axes of rotation are in a substantially vertical orientation, e.g., parallel to the vertical axis $A_{VERT}$ of the aircraft. Accordingly, in some embodiments, the rotors 106 may be oriented in substantially the same configuration as rotors of traditional multicopters.

In other embodiments, the rotors 106 can be attached to the arms 104 in a fixed angular orientation, but one in which the rotational axes $A_1$ of the rotors 106 are nonvertical. As discussed further below, the fixed angle may be such as to improve or optimize a flight efficiency of the aircraft 102. For example, the rotors 106 may be rotated forward at an angle such that, during forward flight (e.g, during high-speed forward flight, or during flight at a predetermined airspeed), a profile of the aircraft is reduced or minimized so as to reduce drag.

In other or further embodiments, the rotors 106 can be attached to the arms 104 in a selectively adjustable manner. That is, the axes of rotation $A_1$ may be manually, mechanically, or electromechanically adjusted, such as by an operator between flights.

In still other embodiments, an angle of the axis of rotation $A_1$ of the rotors 106 may be fully controllable. That is, the axis of rotation of each rotor 106 can be selectively controlled, such as by an electrical coupling with a controller. The axis $A_1$ of the rotors 106 can be dynamically adjusted, such as during flight. In some embodiments, the range of angles through which the axis $A_1$ of the rotors 106 can be adjusted can be delimited. For example, the rotor 106 axes $A_1$ may only be adjustable within a specified range of angles, as discussed further below.

With continued reference to FIG. 2, again, in some embodiments the wings 112 are rotatable about the spars 114. In the illustrated embodiment, the spars 114 extend at angles relative to the lateral axis $A_{LAT}$ of the aircraft 100. Accordingly, the wings 112 can rotate about axes that are nonparallel to the to the lateral axis $A_{LAT}$ of the aircraft 100. As previously discussed, however, in some embodiments, the rotors 106 rotate about the axis $A_2$, which is parallel to the lateral axis $A_{LAT}$. Accordingly, in some embodiments, the axes about which the wings 112 and the rotors 106 can be rotated or otherwise adjusted may be nonparallel to each other.

Moreover, as previously discussed, and as discussed further hereafter, the wings 112 are either fixed relative to or rotatable about the spars 114 in manners which can be determined, at least in part, based on the specifics of the arm mounting assembly 117 via which the wings 112 may be coupled to the spars 114. The axes of rotation $A_1$ of the rotors 106 are similarly fixed relative to or rotatable about the axes $A_2$ of the rotors based on the specifics of the rotor mounting assemblies 118. In various embodiments, the connection interfaces of the rotors 106 to the arms 104 and of the arms 104 to the fuselage 102 may be managed separately. Stated otherwise, the orientation of the rotors 106 can be adjusted independently of the orientation of the wings 112.

Figure 3:
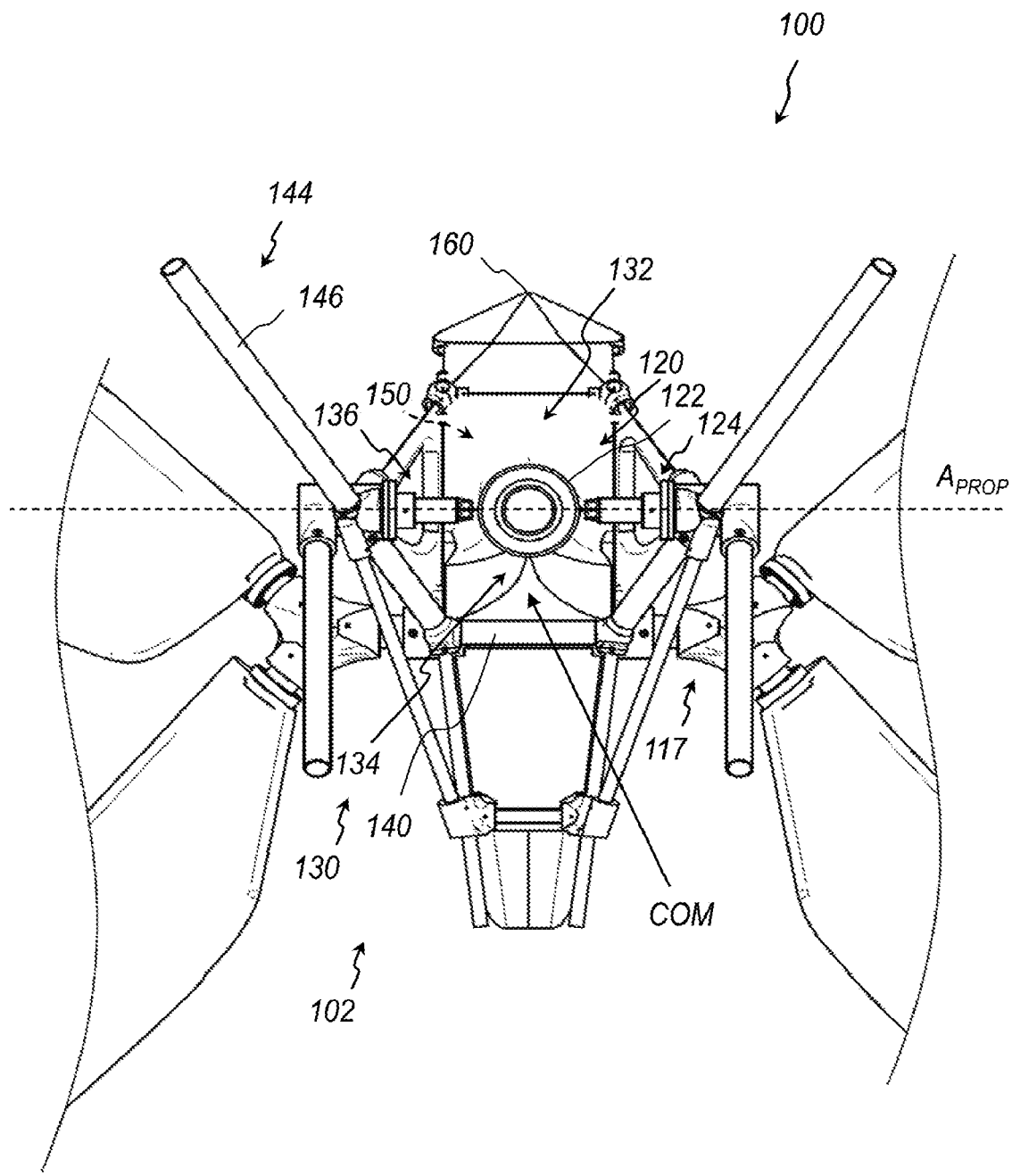
FIG. 3 is an enlarged bottom plan view of a central portion of the multi-rotor aircraft of FIG. 1.

With reference to FIGS. 1 and 3, in certain embodiments, the aircraft 100 can include a supplemental thrust or supplemental propulsion system 120, which may alternatively be referred to herein as a thrust or propulsion system 120. The system 120 can use energy dense fuel sources, such as, for example, any suitable variety of combustible fuels to provide thrust that reduces a load borne by the rotors 106. The combustible fuel may be of any suitable variety. For example, the combustible fuel may be usable with any suitable engine, such as a turbine jet engine. The combustible fuel may comprise one or more forms of hydrocarbon fuel, such as jet fuel, diesel fuel, gasoline, compressed natural gas, etc.; hydrogen fuel; or any other suitable high energy density fuel.

In certain embodiments, at least a portion of the thrust provided by the propulsion system 120 can have an upward component to counteract the forces of gravity on the aircraft 100 and its payload. In other or further instances, at least a component of the thrust provided by the propulsion system 120 can have a forward component that contributes to forward motion of the aircraft 100.

The propulsion system 120 can include any suitable variety of jet engine 122. For example, the jet engine 122 can comprise a turbine engine. The engine 122 can be mounted to the fuselage 102 via an engine mounting assembly 124 of any suitable variety. In some embodiments, the engine 122 is fixedly secured to the fuselage 102. For example, in some embodiments, the engine 122 may be mounted such that the thrust provided thereby is only directed vertically.

In other embodiments, the engine 122 is rotatable relative to the fuselage 102 about a propulsion system axis $A_{PROP}$ (FIG. 3), which can be parallel to the lateral axis $A_{LAT}$ (FIG. 2) of the aircraft 100. In some embodiments, adjustments of the engine angle can be manual or mechanical (e.g., via a direct manipulation prior to flight or via a lever during flight). In other embodiments, adjustments can be made electromechanically, as further discussed below.

The engine 122 can be mounted near a center of mass COM of the aircraft 100, before or after the aircraft 100 is charged with a payload. That is, the COM of the aircraft can shift somewhat when a load is positioned on the aircraft 100, but the engine 122 can remain near the center of mass COM throughout such a shift.

With reference to FIGS. 3 and 4, the engine 122 can be positioned at an underside of the fuselage 102. In the illustrated embodiment, the fuselage 102 includes a frame 130 that defines a cavity 132 within which the engine 122 is received. The cavity 132 can include an air divider 134. The air divider 134 can be particularly useful in embodiments that include more than one engine 122. For example, multiple engines 122 (e.g., two or four) can be positioned side-by-side within the cavity 132. The air divider 134 can ensure that the engines 122 entrain air from separate regions so as to ensure adequate air supply to the engines 122. The illustrated embodiment includes a vents 136 at either side of the cavity 132 to permit air to be drawn into the cavity 132 from the region surrounding the upper side of the fuselage 102.

The frame 130 can have any suitable form to provide structure to the fuselage 102. In the illustrated embodiment, the frame 130 includes a plurality of interconnected struts 140. The arm mounting assemblies 117 can be secured to opposite ends of one such cross strut 140. Any other arrangement is possible.

The spars 114 can be mounted to the frame 130, and can be frame-like in function, in some instances. Accordingly, the spars 114 may be termed as extensions to the frame 130 and/or can be a part of a frame of the aircraft.

In some embodiments, the frame 130 includes landing gear 144 that extends downwardly. Any suitable landing gear is contemplated. The illustrated embodiment includes a plurality of legs 146 on which the frame 130 can rest on the ground.

A fuel compartment 150 can be positioned above the cavity 130. The fuel compartment 150 can keep fuel, which can be dense, near the center of gravity COG and/or may balance weight of a rider. As shown in FIG. 4, a cover 152 may be positioned over the fuel compartment 150. Any suitable fuel tank, container, or bladder 954 (see FIG. 30) may be positioned within the fuel compartment 150. Any suitable fuel line 956 (see FIG. 30) can fluidly couple the fuel bladder 154 to the engine 122.

A nose 160 at a forward end of the fuselage 102 can be substantially cone shaped or may otherwise be aerodynamic. A windscreen (not shown) similar to a windscreen of a bullet bike may rise from the nose 160.

Any suitable handles 162 or other controls (e.g., a hand-held remote control, local control panel, etc.) may be provided in the cockpit of the fuselage. See FIG. 5A. As discussed further below, in some embodiments, the aircraft 100 can be fully piloted by a rider R (FIG. 5A) positioned thereon. For example, the aircraft 100 can include one or more control sticks or other control mechanisms for a pilot to manipulate. In other embodiments, the aircraft 100 may be piloted remotely, such as via a remote control console or any other suitable control device. In some embodiments, the aircraft 100 can be preprogrammed to fly to a preset destination, and may fly substantially autonomously. Accordingly, the presence and/or type of onboard controls may vary.

Figure 5A:
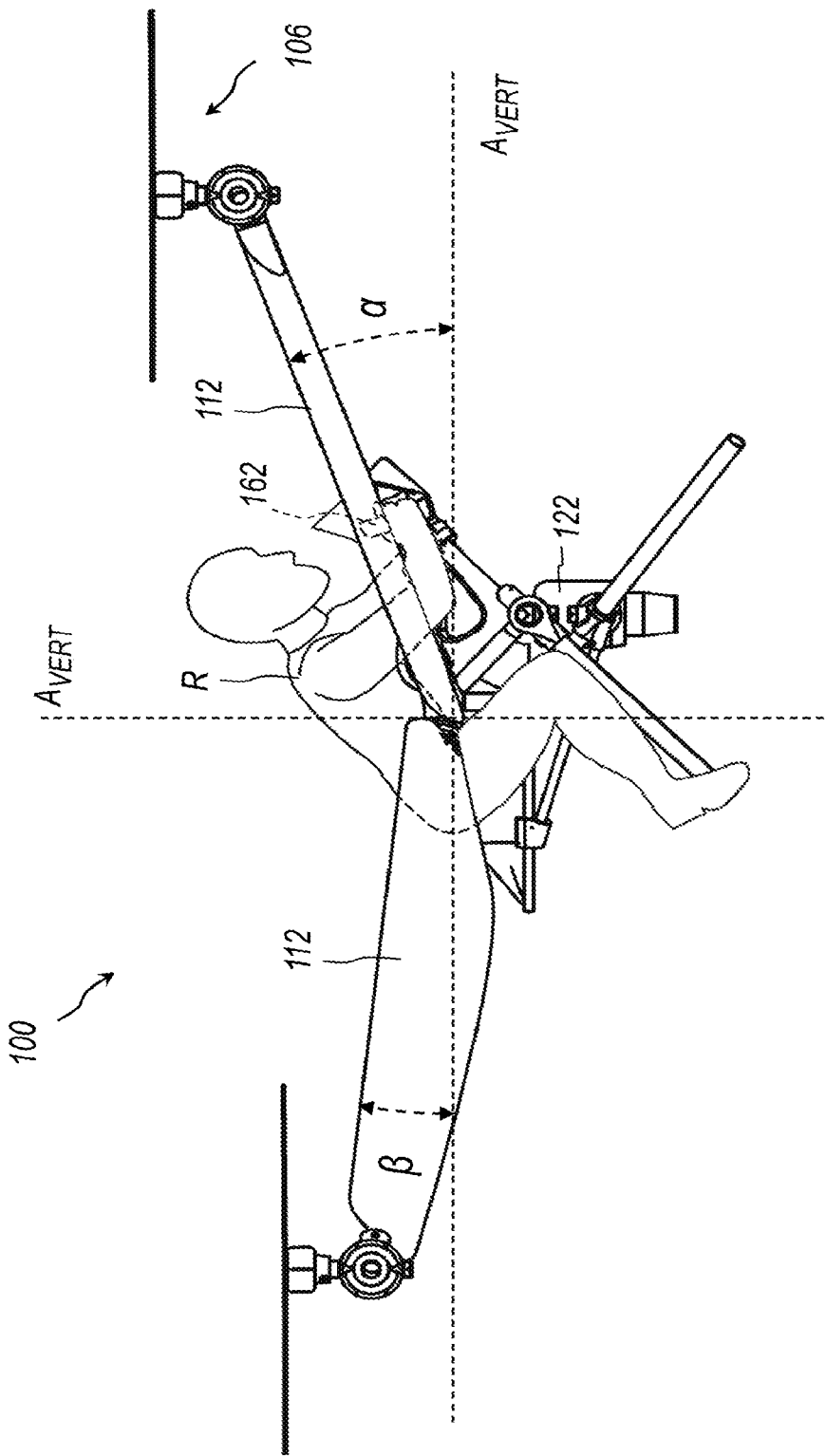
FIG. 5A is a side elevation view of the multi-rotor aircraft with a rider thereon, the multi-rotor aircraft being depicted in a liftoff or hover operational state.

With reference to FIGS. 2 and 5A, the fuselage 102 an include a seat 164 for the rider R. The seat 164, and the frame 130, generally, can be configured for any suitable seating arrangement for the rider R. In the illustrated embodiment, the rider R assumes a prone or crouched position, similar to riding a bullet bike. In the illustrated embodiment, the rider R is shown with his forearms and lower legs in alignment, or substantially defining a straight line. In some instances, the elbow may be even closer to then knees than is shown in FIG. 5A. Again, any suitable seating arrangement is contemplated. The rider R, in the illustrated embodiment, is positioned over the engine 122.

With reference again to FIG. 4, in some embodiments, the fuselage 102 further includes a control compartment 166. In some embodiments, the control compartment 166 and the fuel compartment 150 may be within the same general region. The control compartment 166 can house any suitable set of control components, such as a flight controller and/or other control devices discussed further below.

Figure 5B:
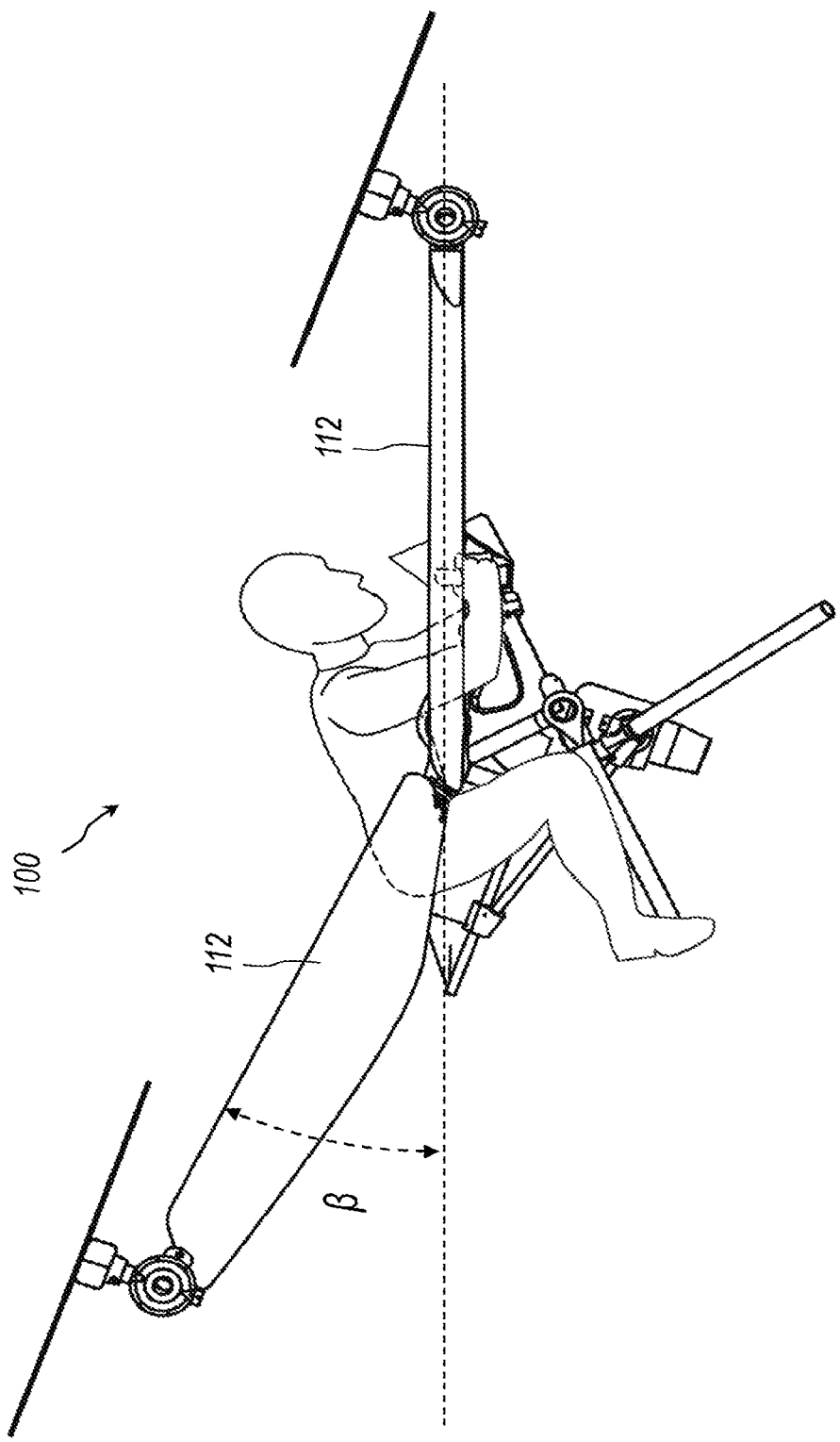
FIG. 5B is a side elevation view of the multi-rotor aircraft with the rider thereon, the multi-rotor aircraft being depicted in a high-speed forward flight operational state.
Figure 6:
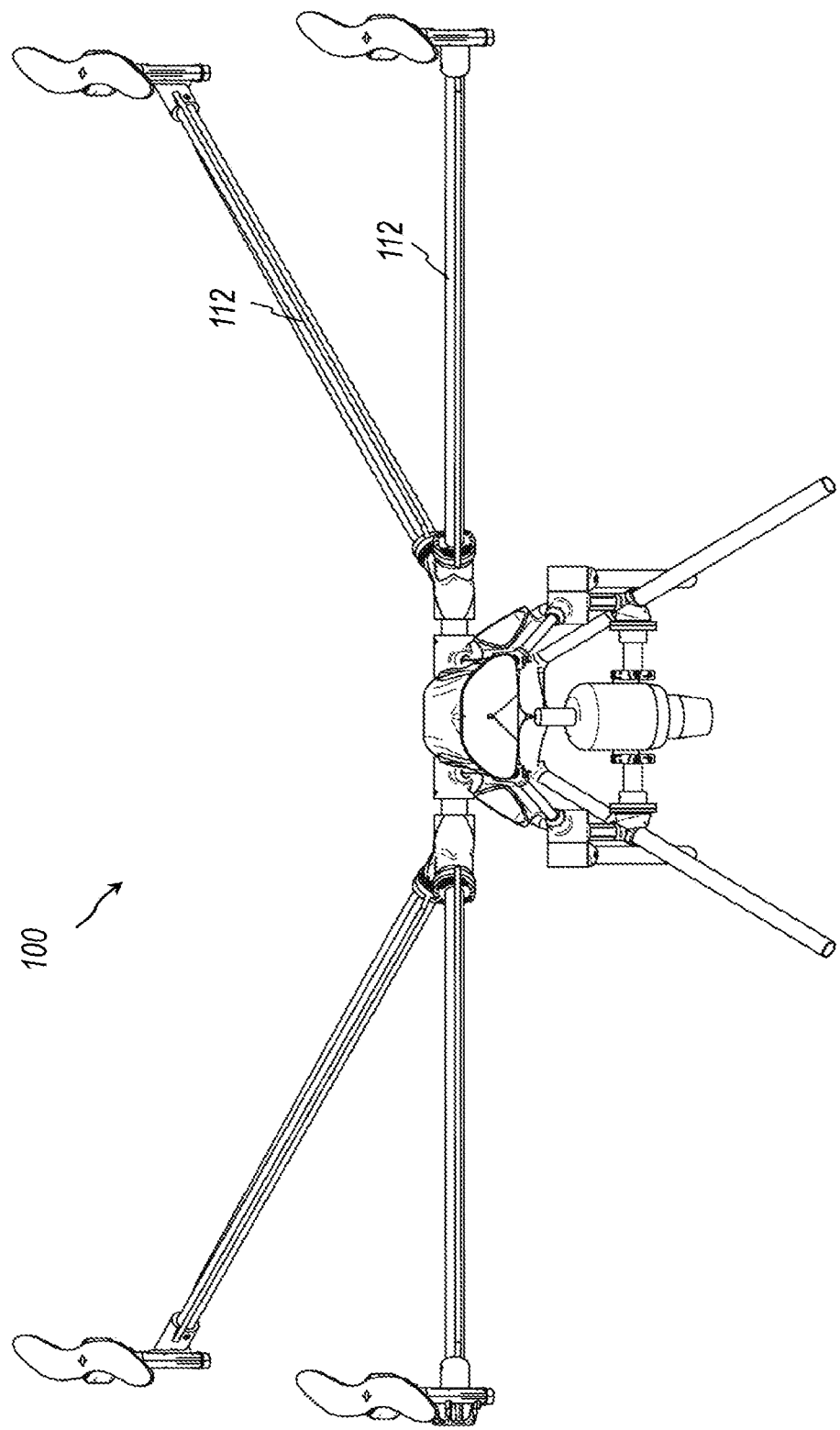
FIG. 6 is a front elevation view of the multi-rotor aircraft in the high-speed forward flight operational state, wherein the wings are depicted schematically as planar elements to render spars and portions of wing mounting assemblies more visible.

With reference to FIGS. 5A and 5B, in some embodiments, the rotors 106 of the multi-rotor aircraft 100 can be angularly fixed relative to the aircraft 100 in positions that are optimized for forward flight. FIG. 5A represents a takeoff or hover position, in which the rotors 106 generally provide upward thrust to counteract gravity. FIG. 5B represents forward flight, in which the speed of the rotors 106 are manipulated to tip the aircraft 100 forward such that a component of the thrust provided thereby achieves forward flight. In some instances, the configuration shown in FIG. 5B represents high-speed forward flight, such as flight above a threshold airspeed (which may be predetermined for a given configuration) or a speed at or near maximum. In some instances, a maximum airspeed of the aircraft 100 is the speed just below a speed at which the rotors 106 can no longer be used as control surfaces.

Again, in the illustrated arrangement, the rotors 106 do not change position relative to the aircraft 100, as between FIGS. 5A and 5B. However, the aircraft 100 rotates forward into a lower profile orientation that is subject to less drag as the aircraft 100 moves forward in the position. This can also be seen in FIG. 6, which is a forward view of the aircraft 100 in the same orientation of FIG. 5B.

Figure 7:
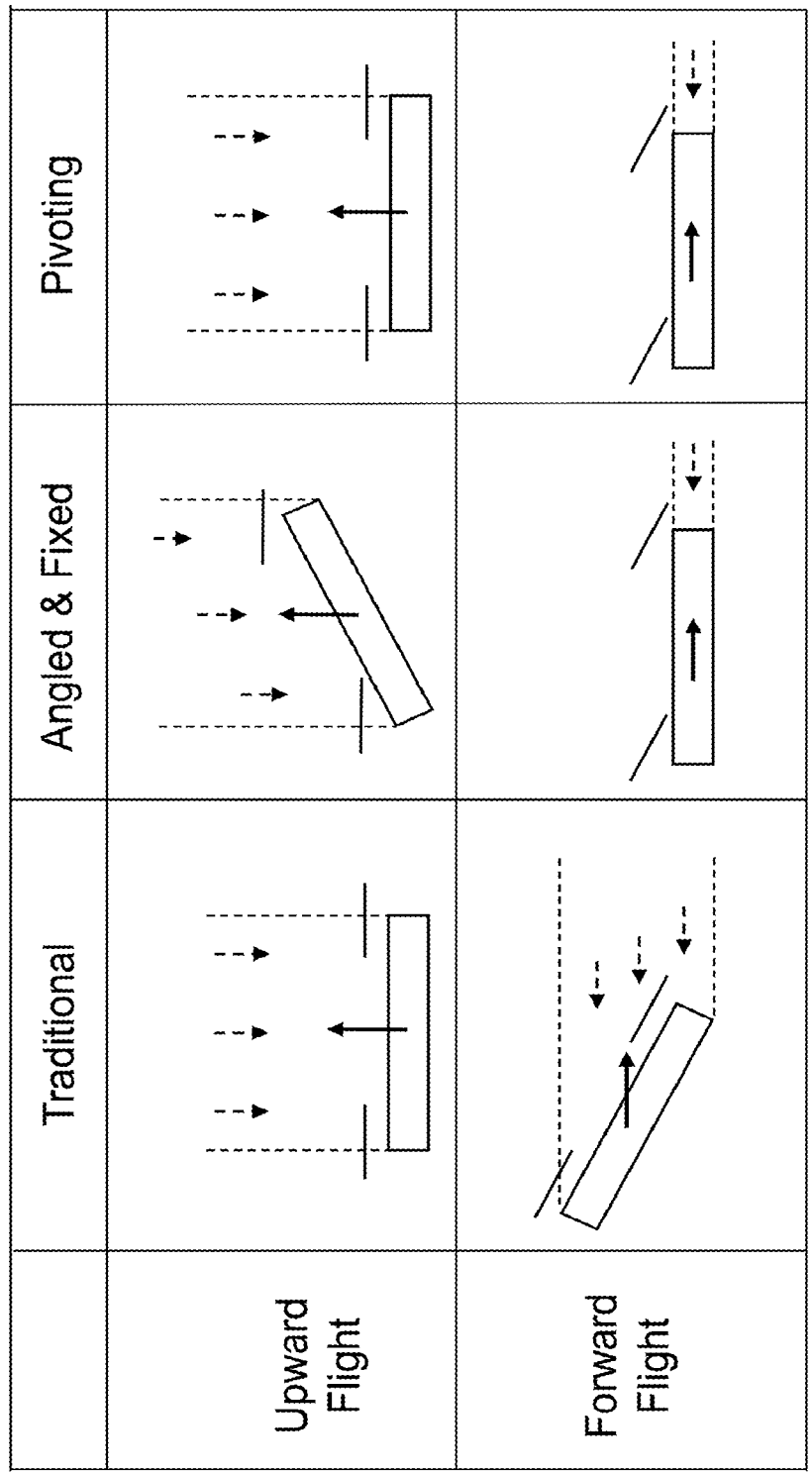
FIG. 7 is a table schematically depicting drag forces that act on different types of multi-rotor aircraft during upward flight and forward flight.

FIG. 7 is a table schematically depicting drag forces that act on different types of multi-rotor aircraft during upward flight and forward flight. In particular, FIG. 7 demonstrates how the aircraft 100 can be optimized for forward flight in a manner that outperforms traditional multicopters. The table illustrates two different manners in which embodiments of the aircraft 100 can be optimized for minimal drag for forward flight.

Each cell of the table is a schematic image that depicts a multi-rotor aircraft. As shown in the left column, traditional multicopters are built aerodynamically to be flown primarily in a hover (level-flight) orientation. When a traditional multicopter begins to fly in a direction having a lateral component, the fuselage (body of the aircraft) tilts, and by tilting the body of the aircraft, rather than the propulsion system itself, the entire body of the aircraft is pushed through the air sideways, which results in an increase in drag, which can be substantial.

By allowing the propulsion system to change pitch, the multicopter can be aerodynamically optimized for its phase of flight. For example, with reference to the right column of the table, the rotors can be rotated in a manner to achieve forward flight while maintaining a low profile (e.g., substantially horizontal orientation) of the fuselage, which can reduce drag. In other embodiments, as shown in the center column, the rotors may instead be fixed in an angled orientation in order to achieve a reduced-drag forward flight. This is similar to what was described above with respect to FIGS. 5A, 5B and 6.

With continued reference to the center column the pitch of the rotors may be fixed at the predetermined (e.g., optimal) angle for forward flight. In various embodiments, the angle may be no less than 10, 15, 20, 25 or 30 degrees, relative to the horizontal, or may be no more than 10, 15, 20, 25, 25 or 30 degrees. In some embodiments, the angle is approximately 22 degrees. In some instances, this arrangement may be advantageous, as there are no additional moving parts as compared with a typical multicopter arrangement. In some embodiments, the fixed-angle arrangement is achieved by mounting the flight controller and the propulsion system at the same angle. The result is a multicopter that hovers in a nose up attitude (see top row, center column) and flies level in forward flight (see bottom row, center column).

Again, with reference to the right column, in other embodiments, the pitch of the motors is selectively transitioned between the forward flight and hover configurations.

This arrangement can be achieved with selectively positioned rotors, such as those described elsewhere herein.

With reference again to FIG. 6, in some embodiments, the forward wings 112 can be substantially horizontal when the aircraft 100 is in the forward flight, or high-speed forward flight. The rear wings can have a more pronounced dihedral angle. In other embodiments, the forward wings 112 can have a slight dihedral angle as well. The dihedral angle can be selected based on the desired performance of the aircraft 100. In some embodiments, stability may be improved with increasing dihedral angle.

In some embodiments, the forward wings 112 can include control surfaces, as discussed further below. In certain of such embodiments, the rotors 106 can be rotated even further forward to provide maximum forward thrust, and control of the aircraft 100 may be achieve solely or primarily via the control surfaces of the wings 112. That is, the rotors 106 may no longer be used for their control surfaces at that point. When airspeed drops to a predetermined level, the rotors 106 may again be used to control flight. In further embodiments, the aft wings 112 can include control surfaces, whether instead of or in addition to control surfaces on the forward wings 112.

With reference again to FIG. 5A, in some embodiments, the rotors 106 may be substantially horizontal when the aircraft 100 is in the hover or upward flight mode. With reference to FIG. 5B, the forward wings 112 move to a substantially horizontal configuration. Accordingly, in the illustrated embodiment, the angle α defined by the forward wings 112 in the upward or hover mode is about the same as the angle defined by the rotors 106 relative to the horizontal in forward flight. As previously discussed, in various embodiments, the angle α can have any suitable value, and in various embodiments, is no less than 10, 15, 20, 25 or 30 degrees, relative to the horizontal, or may be no more than 10, 15, 20, 25, 25 or 30 degrees. In some embodiments, the angle is approximately 22 degrees.

In some embodiments, the rear wings 112 can also define an angle β, which can be nonzero in the upward or hover mode. This angle can help to space the rotors from the ground for takeoff and landing. Any suitable value is contemplated for the angle β. In various embodiments in the lift-off or hover flight orientation, the angle β may extend upward or downward from the horizontal by no greater than 15, 30, or 45 degrees.

Figure 8:
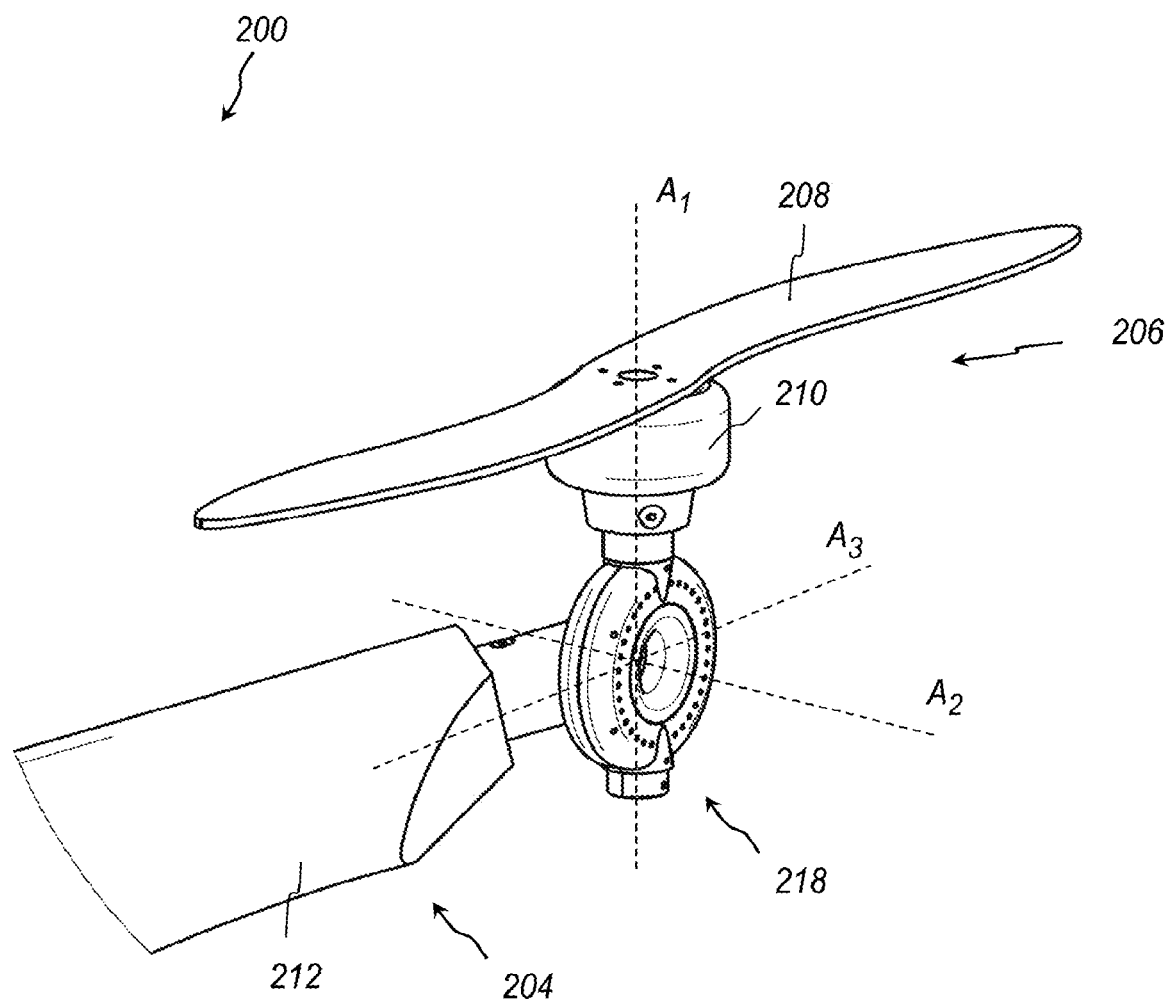
FIG. 8 is a perspective view of an embodiment of a rotor mounting assembly positioned at an end of an embodiment of an arm.

FIG. 8 depicts an embodiment of a rotor mounting assembly 218 of another embodiment of a multi-rotor aircraft 200 that can resemble the aircraft 100 described above in certain respects. Accordingly, like features are designated with like reference numerals, with the leading digits incremented to "2." Relevant disclosure set forth above regarding similarly identified features thus may not be repeated hereafter. Moreover, specific features of the aircraft 200 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the aircraft 200 and components thereof. Any suitable combination of the features and variations of the same described with respect to the aircraft 100 can be employed with the aircraft 200, and vice versa. More generally, any suitable combination of like-numbered components throughout the present disclosure is contemplated. Thus, for example, any of the features of the various embodiments of the rotor mounting assembly 118 disclosed above may be used in place of any of the features of the mounting assembly 218 described hereafter, and vice versa, mutatis mutandis. This pattern of disclosure applies equally to further embodiments depicted in subsequent figures and described hereafter, wherein the leading digits may be further incremented.

The rotor mounting assembly 218 can attach a rotor 206 to an arm 204. As with other embodiments, herein the rotor 206 can include an electrical motor 210 and a rotor blade 208 coupled thereto. The arm 204 can include a spar 214 (FIG. 9) having a distal end to which the rotor 206 is mounted. The axes A1, A2, A3 defined by the rotor mounting assembly 218 have previously been described. The spar 214 can extend at an angle relative to each of the axes A1, A2, A3. Stated otherwise, the spar 214 may define a longitudinal axis that is neither parallel to nor collinear with any of the axes A1, A2, A3 of the rotor mounting assembly 218. The mounting assembly 218 can be configured to rotate about the axis A2, whereas a wing 212 can be configured to rotate about a longitudinal axis of the spar 214.

Figure 9:
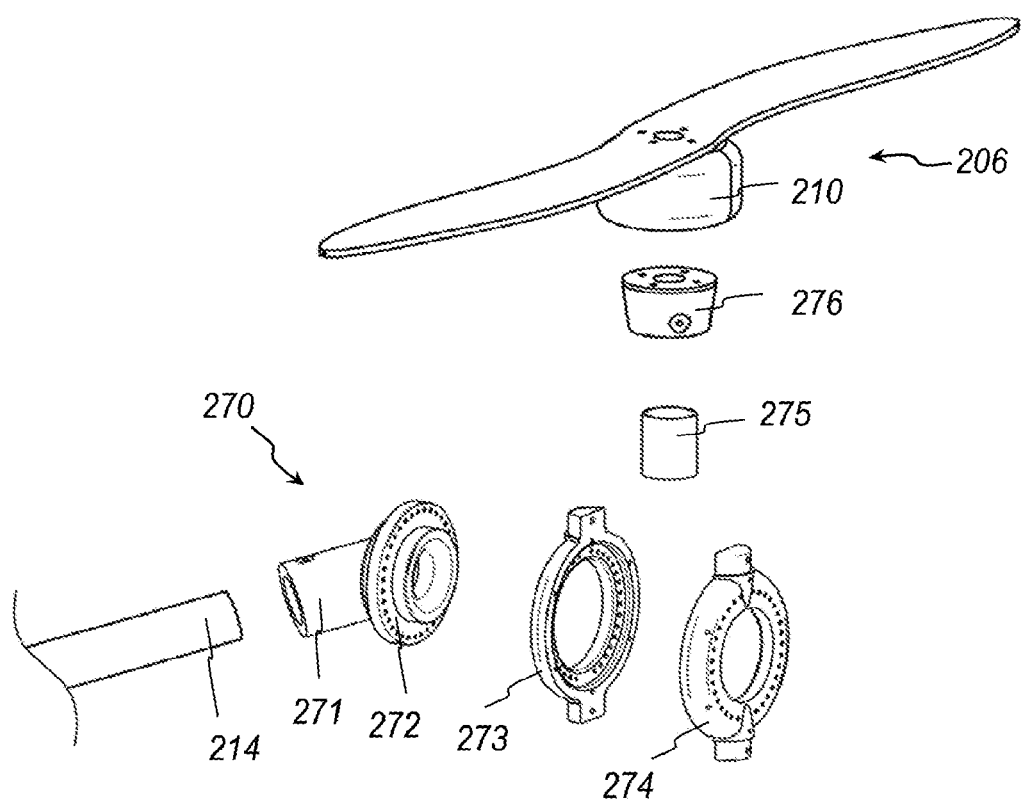
FIG. 9 is an exploded perspective view of the rotor mounting assembly of FIG. 8.

With reference to FIG. 9, the mounting assembly 218 can include a base 270 that includes a spar mount 271 and an annulus 272. The mounting assembly 218 can further include a pair of housing members 273, 274, a post 275, and a mounting block 276.

The spar mount 271 portion of the base 270 is substantially cylindrical and may also be referred to as a sleeve. The spar mount 271 attaches over the distal end of the spar 214. The spar mount 271 defines a longitudinal axis that is collinear with that of the spar 214 when attached to the spar 214. The annulus 272 portion of the base 270, which may also be referred to as a flange, also defines a longitudinal axis therethrough that is angled relative to the longitudinal axis of the spar mount 271. The housing members 273, 274 attach to each other so as to encompass the annulus 272. The housing members 273, 274 thus can rotate over the top of the annulus 272 to select an angle for the rotational axis of the rotor 206. The post 275 can attach over upper protrusions on the housing members and can couple with the mounting block 276 in any suitable manner. The motor 210 can be fastened or otherwise secured to the mounting block 276 in any suitable manner. In this way, the housing members 273, 274, the post 275, the mounting block 276, and the rotor 206 are all fixedly secured together and are selectively rotatable about the annulus 272 of the base 270.

In the illustrated embodiment, a desired angle of the rotor 206 is selected by inserting a fastener of any suitable variety (not shown) transversely through aligned holes in each of the housing member 273, the annulus 272, and the housing member 274. For example, bolt or other fastener can be passed through an opening in each of the three components and then tightened with a nut or other hardware to fix an angular orientation of the rotational axis of the rotor 206. Thus, the illustrated embodiment allows selection of the rotor 206 angle, but is not dynamically adjustable during flight. Such an embodiment can be suitable for fine-tuning a fixed angle of the rotor 206 that achieves a minimum drag during forward flight.

It is noted that wiring or other items can be fed through the spar 114 and through channels defined through the mounting assembly 218. For example, power and/or communication lines can be fed through the mounting assembly 218 and connected to the rotor 206.

It is also noted that any suitable angle delimitation is possible relative to angular movement of the rotor 206. For example, if it were desirable to delimit movement of the rotor 206 through an angle of 90 degrees, a first set screw can be attached to an opening in the annulus 272, and a pair of set screws could be inserted through and attached to two openings in, for example, the housing 274. The two screws in the housing 274 can be angularly spaced from each other by 90 degrees, such that interaction of the internal screw each of the externally mounted screws prevents rotation beyond the predetermined range. Any other suitable stopping mechanism is contemplated.

Furthermore, it is also noted that the illustrated mounting assembly 218 can readily accommodate a second rotor 206 at a bottom thereof. That is, another post 275, mounting block 276, and rotor 206 can be secured to protrusions at the bottom ends of the housing members 273, 274. Such duplication can be used for all four mounting assemblies. Stated otherwise, the aircraft 200 can include four rotors 206 in a manner similar to what is depicted in the drawings with respect to FIG. 1, or it can include eight rotors 206. The additional rotors 206 can significantly increase the control and/or lift that can be achieved via the rotors. Any other suitable numbers of rotors 206 and arms 204 is contemplated.

With reference again to FIG. 8, in some embodiments, the rotor mounting assembly 218 can similarly be adjustable about the axis A3. Such adjustments can adjust a dihedral of the aircraft 200, and thus can fine tune a performance (e.g., stability) of the aircraft 200. In other embodiments, rather than having the rotor mounting assembly 218 be selectively adjustable, an appropriate or desired angle relative to the axis A3 may be designed into the base 270 (e.g., by adjusting an angle between the longitudinal axis of the spar mount 271 and the longitudinal axis through the annulus 272).

Figure 10:
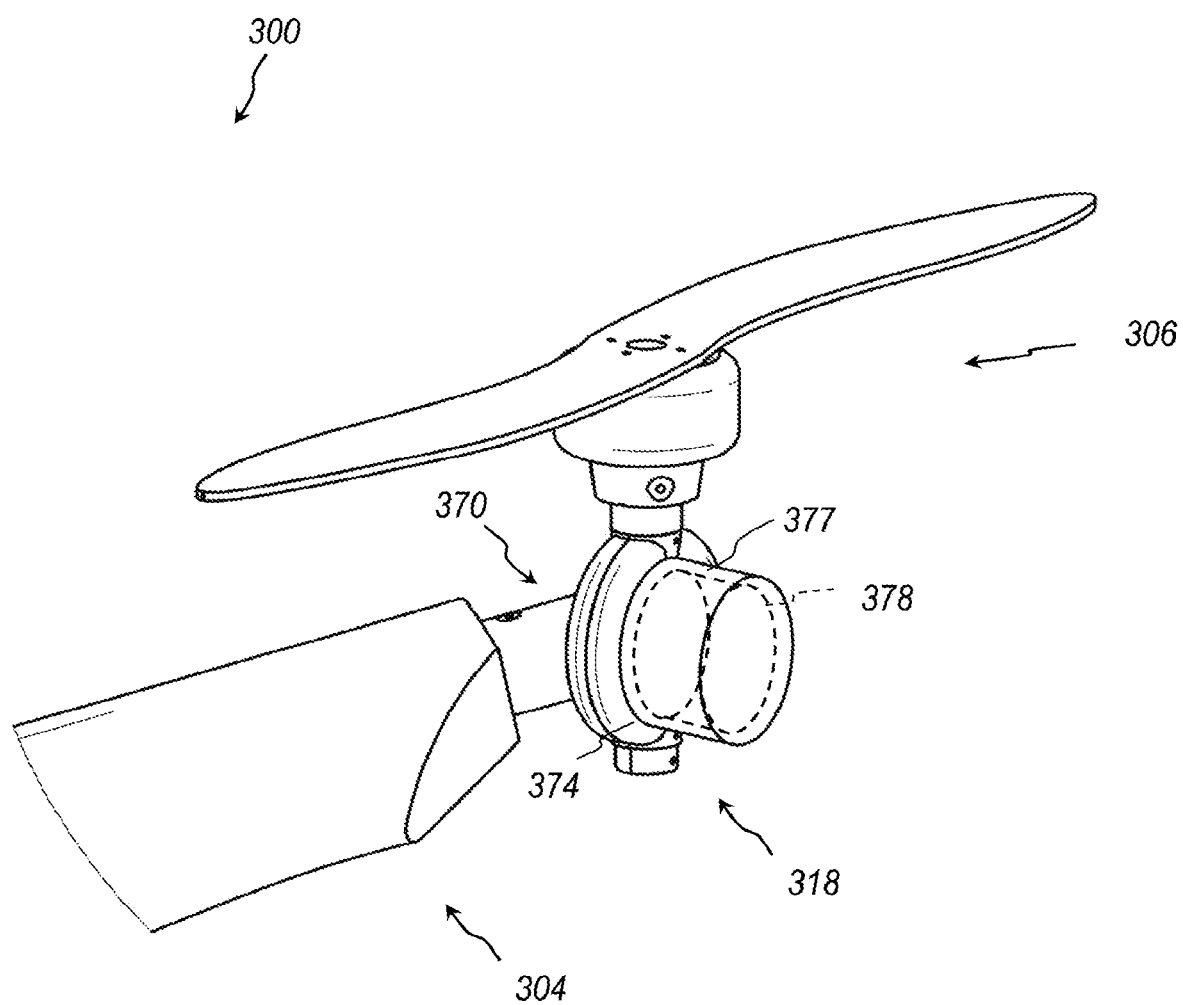
FIG. 10 is a perspective view of another embodiment of a rotor mounting assembly positioned at an end of an embodiment of an arm.

FIG. 10 depicts another embodiment of a multi-rotor aircraft 300 that includes a plurality of rotors 306. Each rotor 306 can by dynamically adjustable, such as via any suitable electromechanical device. The rotor 306 is attached to an arm 304 via a rotor mounting assembly 318 that includes components such as those described above. However, a housing element 374 further includes a protrusion 377 that defines a chamber at an interior thereof. An automated component 378 (such as, for example, an electromechanical component—e.g., a servo, a stepper motor, etc.) is received within the chamber, and a portion thereof is fixedly secured to the protrusion 377. A portion of the automated component 378 is also fixedly secured to a base 370. The automated component 378 is configured to rotate its separate portions relative to each other to achieve rotation of the rotor 306 relative to the arm 304. The automated component 378 can be communicatively coupled (e.g., wired) with any suitable controller, and the controller can send electrical signals to the component 378 to achieve a dictated amount of rotation. Thus, the multi-rotor aircraft 300 includes a plurality of rotors 306 of which the pitch can each be selectively and dynamically adjusted, e.g., during flight. Any other suitable mechanism for achieving such dynamic adjustments is contemplated. Moreover, if it is desirable for the rotor 306 to only be adjustable through a preset range of angles, this limitation can be programmed into the controller and implemented thereby.

It has previously been noted, and will be further discussed hereafter, that the wings 112 may also be dynamically rotated (e.g., about the longitudinal axes of the spars 114), and the engine 122 can be dynamically rotated about the axis $A_{PROP}$. Similar arrangements can achieve such dynamic rotation. For example, the controller can be communicatively (e.g., electrically) coupled with any suitable automated component (e.g., an electromechanical component), which in turn is mechanically coupled with a wing or with the engine. The controller may provide signals to the automated component to achieve a dictated degree of rotation.

Figure 11:
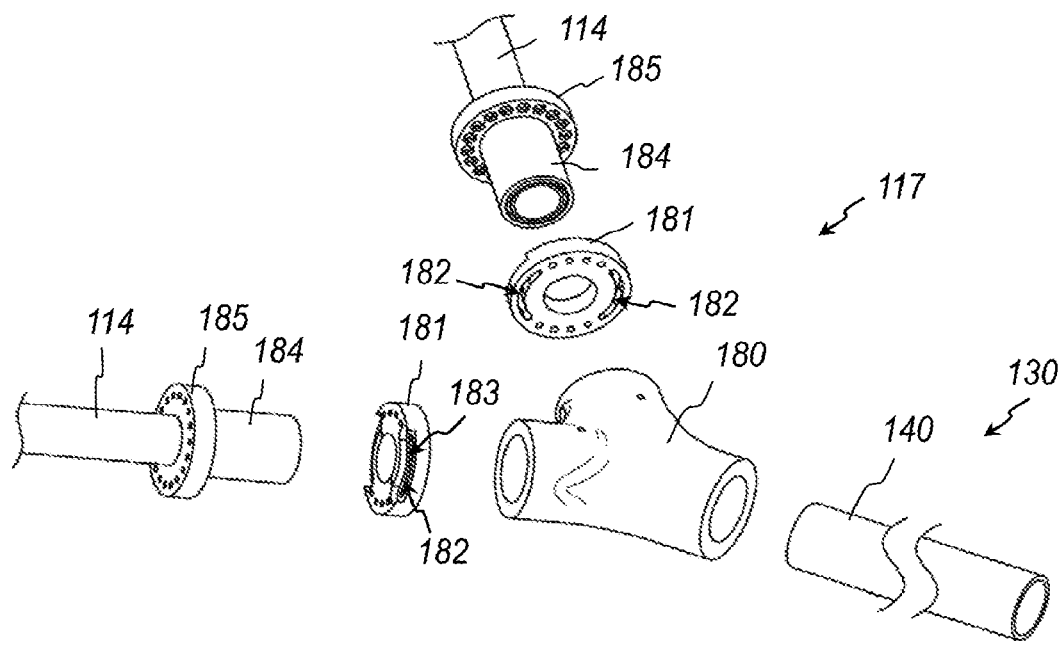
FIG. 11 is an exploded perspective view of an embodiment of an arm mounting assembly.

For example, with reference to FIG. 11, an embodiment of the arm mounting assembly 117 mentioned above is shown in an exploded or disassembled state. Depicted in this drawing are two wing spars 114 and a strut 140 of the fuselage frame 130. Although not shown in this drawing, two wings 112 that extend over the spars 114 are also coupled to the arm mounting assembly 117.

The illustrated arm mounting assembly 117 includes a socket or y-mount 180 that is sized to receive into channels defined thereby an outboard end of the strut 140 and proximal or inboard ends of the spars 114. The y-mount 180 can be fixedly attached to these tubular elements in any suitable manner. It is noted that in some embodiments, wiring or other items can be fed through one or more of the strut 140, the y-mount 180, and the spars 114. For example, power lines and communication lines may be fed through these components.

The arm mounting assembly 117 can further include a pair of collars 181 and a pair of bases 184. Although, in FIG. 11, the collars 181 are depicted as being positioned between the bases 184 and the y-mount 180, the collars 181 will in practice be positioned over the spars 114 and slid down (e.g. proximally) toward the bases 184. Thus, the collars 181, in practice, are positioned distal to the bases 184.

Each spar 114 is received within a central channel of one of the bases 184 an is connected thereto. The bases 184 are then inserted into channels defined by the y-mount 180 and are attached thereto. For example, the bases 184 include flanges 185 having openings through which fasteners can be inserted for coupling to the y-mount 180.

The collars 181 are attached to proximal ends of the wings 112. The wings 112 and the collars 181 are positioned over the spars 114, and the collars 181 are attached to the flanges 185.

In the illustrated embodiment, the collars 181 include two tracks 182 at opposite sides. Each track 182 extends for 90 degrees. A distal side of the track 182 includes a recess 183 sized to receive the head of a fastener, such as a screw or a bolt, that can abut either end of the track. The use of two tracks 182 is redundant—rotation limitation could be achieved with a single track 182. Any angular length of the tracks 182 is contemplated. In the illustrated embodiment, the 90-degree tracks permit rotation of the wings 112 through only a 90-degree range.

Principles discussed above with respect to the automated component 378 apply equally to the mounting assembly 117. That is, the mounting assembly 117 can be automated in similar manners using any suitable automated components (e.g., electromechanical components) in communication with a controller. Thus, rotation of the wings 112 about the spars 114 can be automated and, if desired, a degree of the rotation can be delimited.

FIGS. 12A and 12B depict an embodiment in which the wings 112 are delimited to a 90-degree rotation. In FIG. 12A, the aircraft 100 is in either a hover mode or an upward flight mode. Due to the amount of thrust being directed downward by the rotors 106, it can be desirable for the wings 112 to have a low profile relative to the downdraft.

In some embodiments, the wings 112 are configured to freely rotate relative to the spars 114. That is, the wings 112 can operate on the free-wing concept, in which the wings 112 "weathervane" in to position depending on the force and direction of wind acting thereon. That is, in some embodiments, the wing is configured to automatically reorient in the wind stream or airstream in a manner such as a weathervane (for example), to minimize or reduce drag and maximize or increase lift, thereby supplementing the lift produced by the rotor blades. This can reduce energy consumption and improve endurance and efficiency. Thus, when then wings 112 can freely rotate about the spars 114 (or freely rotate, within the range to which they are angularly delimited, such as by the tracks 182 discussed above) they may naturally assume the configuration depicted in FIG. 12A due to the downdraft from the rotors 106 during takeoff, upward flight, landing hovering, etc.

In other embodiments, the wing positions 112 may be controlled (e.g., via a controller), and thus the controller may provide control signals to adjust the position of the wings into the orientation depicted in FIG. 12A for takeoff, upward flight, landing, hovering, slow flight, etc.

In the illustrated embodiment, the rotors 106 are rotatable to achieve an aggressive forward flight. That is, FIG. 12B depicts high-speed forward flight in which the rotors 112 provide significant amounts of thrust that tend to move the aircraft 100 forward through the air. Again, in embodiments where the wing 112 is configured to passively move in accordance with wind conditions, the wind from the bottom of the rotors 106, in addition to the high wind flow in a rearward direction due to the forward flight of the aircraft 100, can cause the wing 112 to naturally rotate to a more horizontal orientation such as that typically seen with fixed wing aircraft. Again, in some embodiments, the amount of rotation that the wing 112 can naturally undergo due to airflow conditions can be delimited by mechanical stops or other stopping apparatus (e.g., electromechanical).

In other embodiments, the wing positions 112 may be controlled (e.g., via a controller), and thus the controller may provide control signals to adjust the position of the wings into the orientation depicted in FIG. 12B for forward flight—e.g., for high-speed forward flight.

Figure 13A:
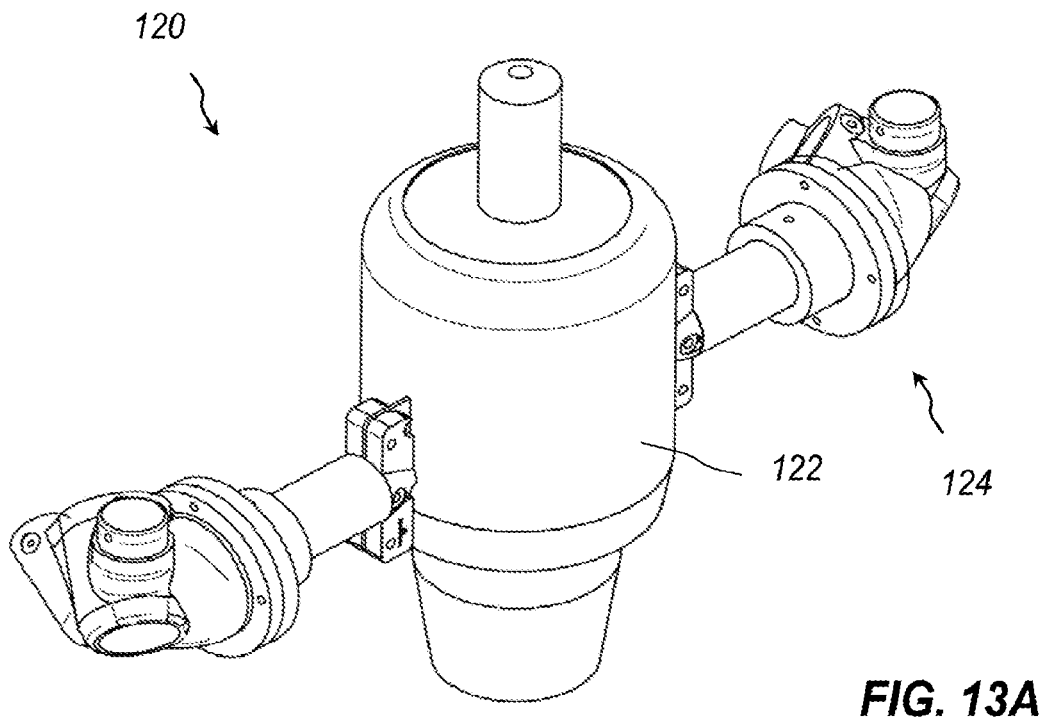
FIG. 13A is a perspective view of an embodiment of an engine mounting assembly that includes a pitch-adjustable engine, as depicted during upward flight.
Figure 13B:
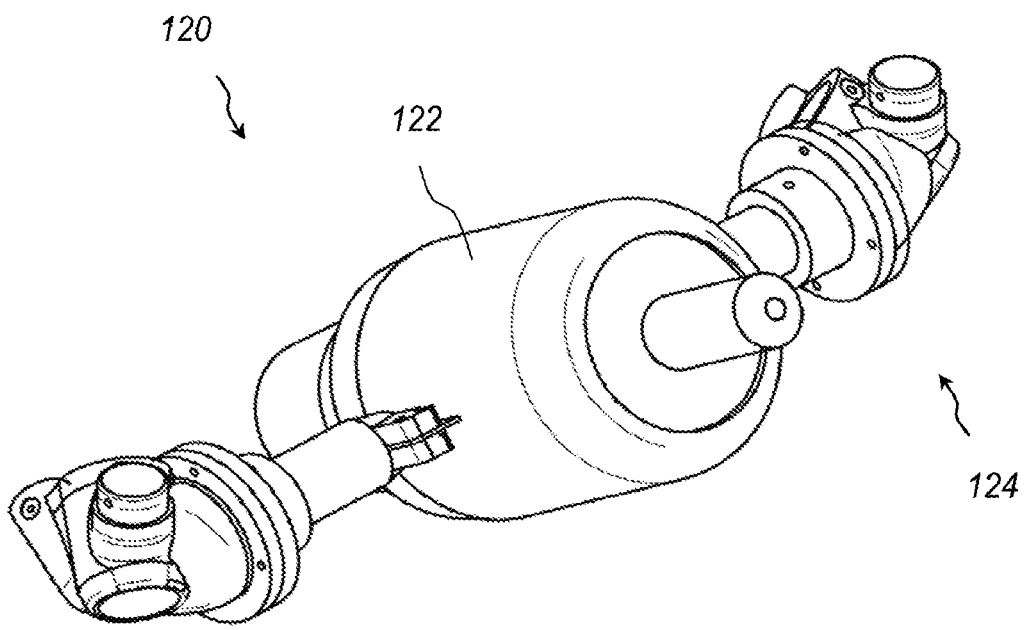
FIG. 13B is a perspective view of the engine mounting assembly and engine during high-speed forward flight.

FIGS. 13A and 13B depict the supplemental propulsion system 120 in two different operational modes, such as those described above. In particular, aircraft 100 is in a hover, slow flight, upward, downward, takeoff, landing, etc. flight pattern in FIG. 13A and is in a forward flight pattern (e.g., high-speed or rapid forward flight) in FIG. 13B. In FIG. 13A, the engine 122 is oriented substantially vertically to maximize downward thrust. In FIG. 13B, the engine 122 is tilted forward such that a component of the thrust contributes to forward flight and another component thereof reduced the load on the rotors.

As with other swiveling, pivoting, or rotating systems previously described, the engine mounting assembly 124 can be manually, mechanically, or automatically (e.g., dynamically) adjusted. Any of the foregoing disclosure applied equally with respect to the engine mounting assembly 124. Thus, in some embodiments, a controller can send signals to an automated device (e.g., electromechanical component, such as a servo motor, etc.) to effect rotation of the engine 122 to a desired or preset orientation.

Figure 14:
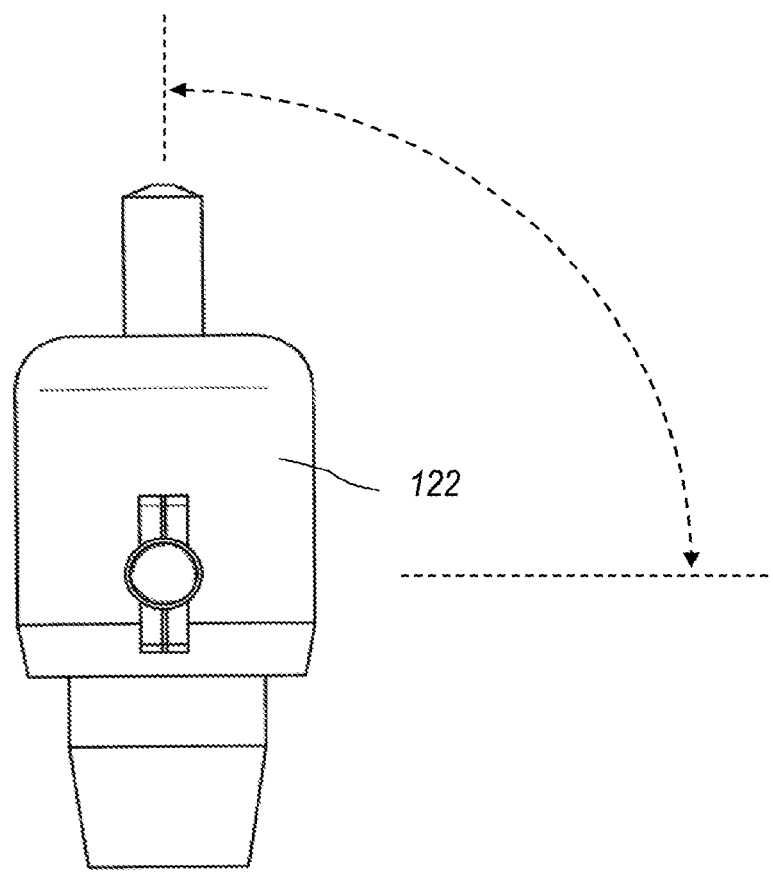
FIG. 14 is a side elevation view of another embodiment of an engine and an engine mounting assembly that provides the engine with a large range of angular motion relative to the multi-rotor aircraft, wherein the engine is shown in a vertical position suitable for, e.g., hovering or upward flight.

With respect to FIG. 14, as with other embodiments herein, the amount of rotation of the engine 122 may be delimited or otherwise bounded or selected to be within a preset, predetermined, or otherwise selected range. In the illustrated embodiment, the angle is from 0 degrees (relative to the vertical) to 90 degrees. In various embodiments, the upper end of the range is no greater than about 45, 50, 60, 70, 75, 80, 85, or 90 degrees.

FIG. 15 depicts a portion of another embodiment of an aircraft 400 that includes an arm 404. The arm 404 includes a spar 414 about which another embodiment of a wing 412 can rotate. The rotation may be passive, such as in a free wing arrangement, or may be controlled. In either case, the wing 412 may be configured to lock into place when the wing is substantially horizontal or otherwise in a predetermined flight orientation. This generally occurs during a forward flight path, or stated otherwise, during high-speed flight. As used herein the term "high-speed forward flight" or the like refers to flight in which forward motion is predominant, such that flight similar to fixed wing aircraft may be desirable. "High-speed" may be determined from a predetermined airspeed. For example, once airspeed reaches a "high-speed" or "forward flight mode" threshold, it may be desirable for the wing 412 to lock into the forward flight orientation.

Again, with passive rotation, the locking may occur naturally once the wing reaches a desired position. This can be achieved via any suitable locking mechanism, such as a spring lock, an electromechanical lock, etc. It may also be desirable to unlock the wing from this orientation once airspeed drops back below the threshold value. Any suitable method or mechanism is contemplated for unlocking the wing. For example, the locking mechanism can be an electromechanical lock, such as may be actuated by a servo or the like, which can be selectively locked or unlocked via a controller, such as the controllers discussed below.

Further, active rotation, which may also be referred to as controlled rotation, of the wing 412 is also possible. Any such locking may naturally result from controls that oriented the wing 412 in the forward flight orientation to begin with (e.g., if no further controls are provided to again rotate the wing, the wing may remain in its current state of operation). Moreover, in controlled systems, the wing can be "unlocked" from its forward flight mode as the controller provides controls to rotate the wing when airspeed drops below a predetermined level.

In the illustrated embodiment, the wing 412 includes control surfaces 490, 491. Any suitable control surface or surfaces (one or more, two or more, three or more, etc. such surfaces) is or are contemplated. In the illustrated embodiment, the control surface 490 is a flap and the control surface 491 is an aileron. In other embodiments, the wing 412 can include a single control surface, such as a flaperon.

In this forward flight mode, the aircraft 400 may operate similar to a traditional fixed wing aircraft. For example, the rotors 406 may be rotated so as to achieve maximum forward thrust, such that the rotors 406 may no longer be used as control surface—instead, they are used solely to generate thrust. In some embodiments, an engine likewise can be in its forwardmost orientation, or can have maximum rotation to achieve forward thrust.

In the illustrated embodiment, an arm mounting assembly 417 includes a differently shaped collar 481 that better conforms the flatter inboard surface of the wing 412.

Figure 16:
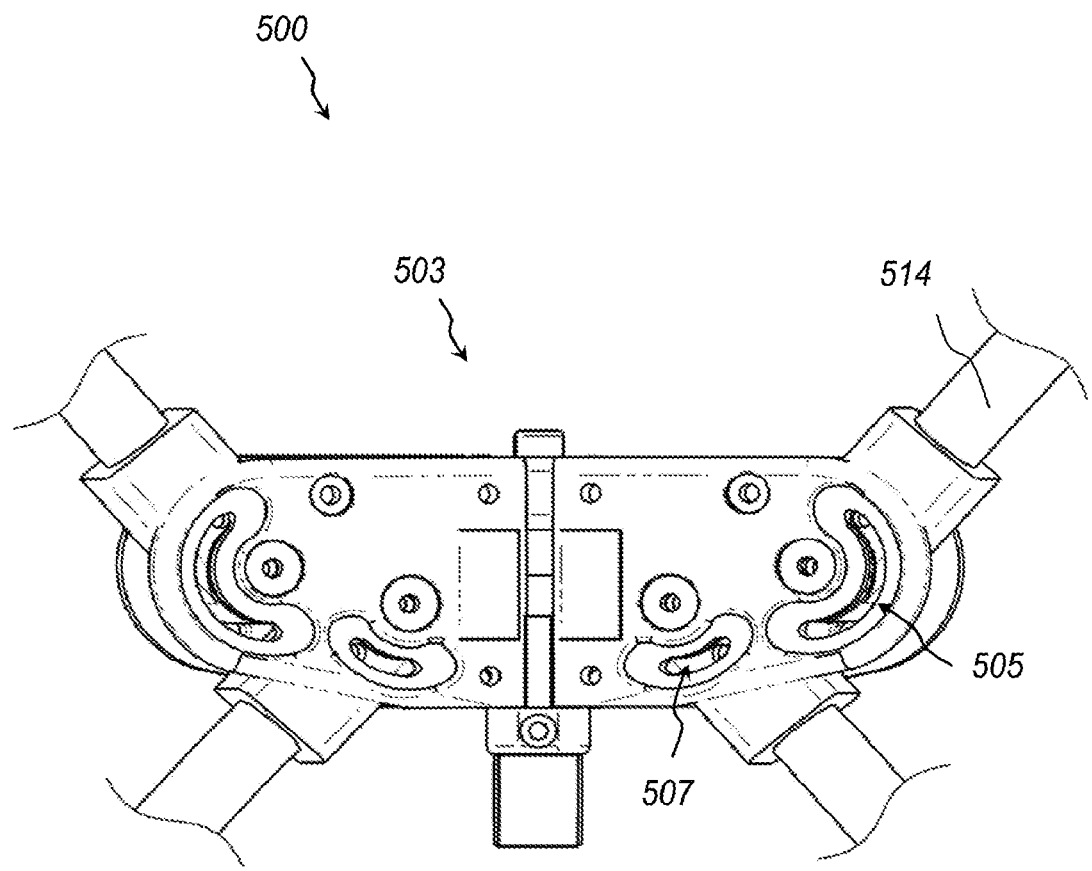
FIG. 16 is a top plan view of another embodiment of an arm mounting assembly that permits four arms of a multi-rotor aircraft to transition between a stowed state and a deployed state.

FIG. 16 depicts another embodiment of a multi-rotor aircraft 500 that includes a hub 503 via which wing spars 514 are coupled to the fuselage 502. The hub 503 permits rotation of the wings to a stowed configuration. The hub 503 includes tracks 505 for the front wings to be folded rearward, and further includes tracks 507 for the rear wings to be folded rearward. The front tracks 505 are longer than the rear tracks 507, as all wings are folded rearward in the illustrated embodiment. Other suitable mechanism to achieve foldable wings are also contemplated. In some embodiments, deployment and/or retraction of the wings is automated (e.g., via electromechanical devices).

Folding the wings in this manner can permit the quadcopter to be stowed in a low-profile orientation. This may be advantageous for storage purposes. In other or further instances, foldable wings may permit ready deployment of the quadcopters from and/or loading of the quadcopters onto larger aircraft during flight.

The present disclosure expressly contemplates all possible combinations of the features discussed herein. That is, each separate feature or advantage can be employed individually with multi-rotor aircraft to achieve improvements. Stated otherwise, each feature discussed herein can be generalized for applicability to any other aircraft or system described herein. Moreover, multiple features may be combined in other embodiments.

By way of example, and not limitation, various options have been discussed with respect to arm configurations for a multi-rotor aircraft. For example, various embodiments may include any of the following wing configurations: arms without wings in which only wing spars are present, in which rotors are attached to the wing spars; one or more arms do not include wings, and may only have spars, and one or more arms do include wings; wings that do not include control surfaces; wings that include one or more control surfaces; wings that lock into place on order to use control surfaces on the wings; pivoting wings; wings that pivot passively; wings that include controlled pivoting; wings having a delimited range of motion; wings that are controlled based on airspeed measurements; etc.

Similar lists to the foregoing may be made with respect to the various features described with respect to rotors. Likewise, similar lists may be made with respect to the various features described with respect to supplemental thrust systems, such as jet engines. The present disclosure contemplated every possible permutation of such features. Thus, the inventors reserve the right to claim every possible combination of features disclosed herein.

Figure 17:
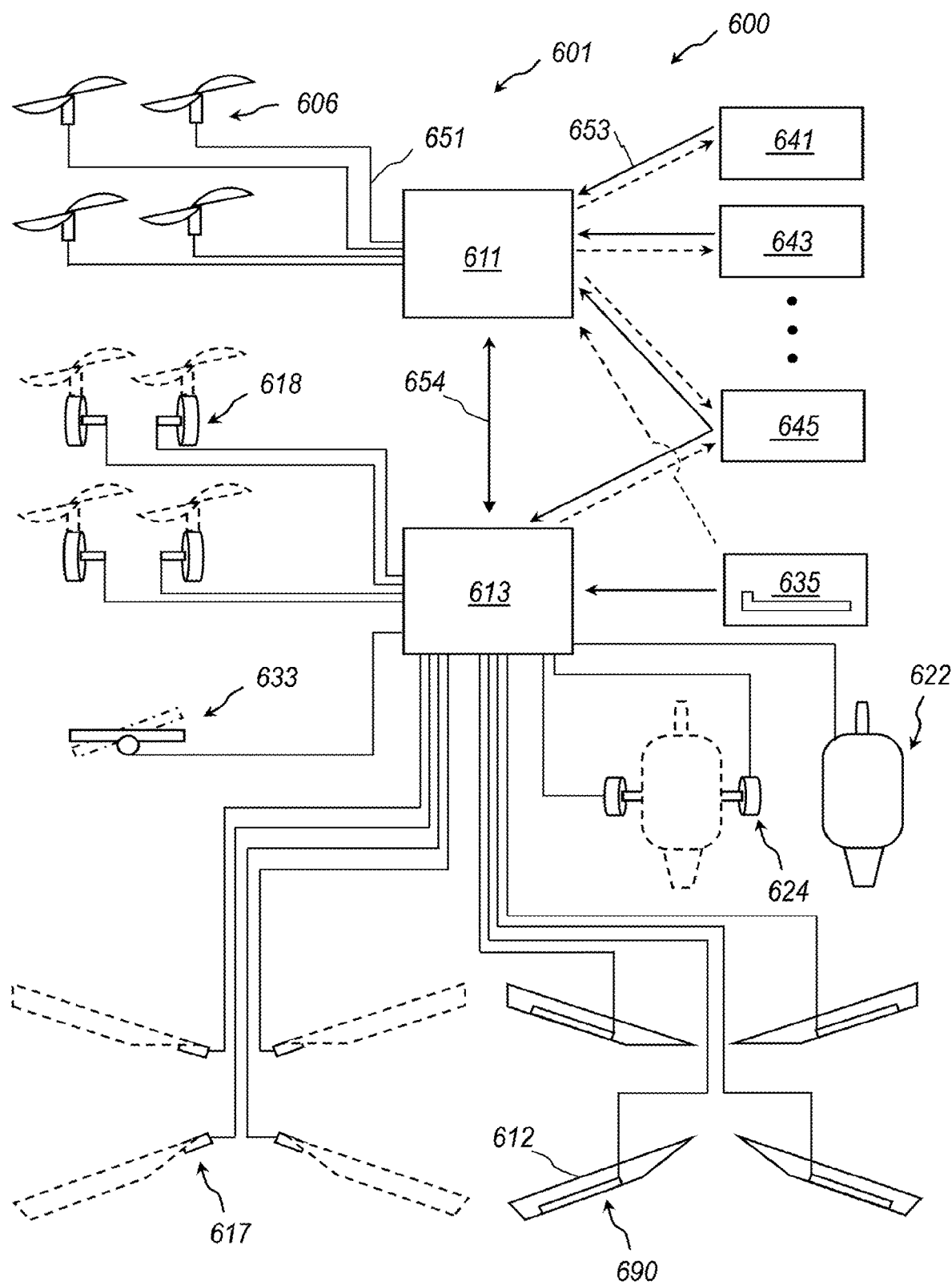
FIG. 17 is a schematic diagram of an embodiment of a control system of an embodiment of a multi-rotor aircraft.

FIG. 17 is a schematic diagram of an embodiment of a control system 601 for an embodiment of a multi-rotor aircraft 600, similar to embodiments previously discussed. The components, features, and operations of the components will be readily apparent from the foregoing disclosure, and thus will not be repeated hereafter. What follows are also descriptions of how the control system 601 can implement some of the features discussed elsewhere herein.

In the illustrated embodiment, the multi-rotor aircraft 600 includes four rotors 606 at the ends of four arms in an arrangement such as that depicted in FIG. 1. The rotors 606 are coupled to the arms via automated rotor mounting assemblies 618, which can automatically (e.g., via an electromechanical device such as a servo or stepper motor) rotate the rotors 606 along an axis orthogonal to an axis of rotation of the rotors, as previously described.

The rotors 606 are communicatively coupled to a flight controller 611 via communication interfaces 651. The communication interfaces 651 can be of any suitable variety, whether wired or wireless. For example, the communication interfaces may comprise electrical wiring, optical fibers, or other physical linkages (wires, cables, etc.) and/or may be achieved via transponders, receivers, transceivers, or via any other suitable wireless interface. Thus, the term "communicative coupling" is a broad term that includes any suitable communication interface. For the sake of convenience, the communication interfaces 651 may also be referred to as communication lines 651, but the term "line" should not be ascribed any limiting effect. This is true of other communication interfaces and communication lines disclosed herein.

The flight controller 611 can be of any suitable variety. In the illustrated embodiment, the flight controller 611 is a standard or off-the-shelf controller that may presently be available commercially. Any other flight controller 611, including those that may be developed hereafter, are contemplated. The off-the-shelf controller of the present embodiment is configured to operate traditional multicopters, and thus is configured for use with rotors that have fixed axes of rotation, which axes of rotation may generally be vertical. Stated otherwise, the flight controller 611 can be configured to control a direction, speed, and/or other flight parameter of the aircraft 600 by individually controlling the speed of the various rotors 606, or stated otherwise, by controlling the speed of the rotors 606 on an individual basis (e.g., one or more of the rotors 606 can be operated at speeds greater than or lower than one or more of the remaining rotors 606). As an illustrative example, in some embodiments, the controller 611 can be an A2 flight controller system, available from DJI of China, with a place of business in Los Angeles, Calif.

One or more input or input devices 641, 643, 645 to the flight controller 611 are possible, including one or more standard inputs for multicoptors. For example, in some embodiments, the input devices 641, 643, 645 can include one or more of an accelerometer, a gyroscope, an inertial measurement unit (IMU), a compass, a magnetometer, a barometer, a GPS unit, a remote controller (such as a remote control console, e.g., a handheld remote control device), etc., and/or two or more of these incorporated into a single device. Of course, a wide variety of remote control options or other mechanisms for providing input to the controller 611 are possible and are contemplated by the present disclosure. For example, in some instances, a smartphone may be used to provide instructions to the controller 611, such as via a dedicated application. In the illustrated embodiment, the input device 641 comprises an IMU, the input device 643 comprises a GPS unit, and the input device 645 comprises a handheld remote control console. The ellipses between the GPS unit 643 and the handheld remote controller 645 indicate that an undetermined number of additional inputs are contemplated.

The input devices 641, 643, 645 are communicatively coupled to the flight controller 611 via communication interfaces 653. The communication interfaces 653 can likewise be of any suitable variety, whether wired or wireless. For example, the communication interfaces may comprise electrical wiring, optical fibers, or other physical linkages (wires, cables, etc.) and/or may be achieved via transponders, receivers, transceivers, or via any other suitable wireless interface. Thus, the term "communicative coupling" is a broad term that includes any suitable communication interface. In some instances, communication between one or more of the input devices 641, 643, 645 may be two-way, in that the flight controller 611 may not only receive input (e.g., information, instructions, etc.) from the devices 641, 643, 645, but may provide outgoing communications (e.g., provide status updates or other information). This possibility of two-way communication is indicated with arrows going in either direction. Of course, two-way communication is also possible via the communication lines 651—that is, although the communication interfaces 651, 653 are depicted differently in the drawings, there may effectively be no difference between them.

In some embodiments, another possible input device that may be in direct communication with the flight controller 611 is an airspeed sensor 635. The airspeed sensor 635 may, alternatively, only be in direct communication with a system controller 613, which is discussed more fully below.

Moreover, in the illustrated embodiment, the flight controller 611 is shown as being communicatively coupled with the system controller 613 via a communication interface 654. For reasons that will be apparent from the discussion that follows, in some embodiments, there may, in fact, be no direct or indirect communication linkage between the flight controller 611 and the system controller 613. That is, the controllers 611, 613 may operate entirely independently of each other. Thus, for example, the system controller 613 may be custom made for a particular application, whereas the flight controller 611 may be of a standard, commercially available variety, and the flight controller 611 may operate in a manner it is already programmed or otherwise configured for—that is, in its preset, preconfigured, or as-manufactured state.

With continued reference to FIG. 17, the system controller 613 may also be communicatively coupled (in one-way or two-way communication) with one or more of the input devices 641, 643, 645, 635. In the illustrated embodiment, the system controller 613 is communicatively coupled with the handheld remote controller 645 and with the airspeed sensor 635.

Moreover, the system controller 613 is communicatively coupled, via communication lines (e.g., via wiring or the like) with various electromechanically controlled systems of the aircraft 600. In particular, the system controller 613 is communicatively coupled with an engine 622 to control the operation thereof, such as to turn the engine on or off, to control an amount of thrust provided thereby, etc. The system controller 613 can control operation of the engine 622 via delivery of one or more electrical signals thereto.

As previously discussed, the engine 622 can provide supplemental lift and/or supplemental thrust. The direction of the thrust provided by the engine 622 may be dynamically adjusted or controlled. That is, the engine 622 is automatically rotatable via an engine mounting assembly 624, such as engine mounting assemblies previously discussed. For example, an angle of the engine 622 can be controlled by electromechanical devices (e.g., servos, stepper motors), which can be communicatively coupled with the system controller 613. The system controller 613 can control the electromechanical devices via delivery of one or more electrical signals thereto.

The wings 612 of the illustrated aircraft 600 include control surfaces 690, such as, for example, one or more of the control surfaces 490, 491 discussed above. The control surface 690 can be movable relative to a wing body so as to control flight of the aircraft 600 when it is moving forward. As discussed further below, the control surfaces 690 may, in some instances, only be used when the aircraft 600 is in a forward flight mode, with the wings having been rotated to a position in which the airfoil thereof substantially provides upward lift. In such circumstances, the control surfaces 690 may operate similar to standard wing-based control surfaces, such as are used in fixed-wing aircraft. Movement of the control surfaces 690 may be achieved, for example, using standard electromechanical devices for such operation. The electromechanical devices that control movement of the control surfaces 690 can be communicatively coupled with the system controller 613. The system controller 613 can control the electromechanical devices via delivery of one or more electrical signals thereto.

Moreover, the wings of the illustrated aircraft 600 are mounted to the fuselage via automated arm mounting assemblies 617, which can automatically rotate the wings. The conditions for such rotation have been discussed previously, and may also be discussed further below. The system controller 613 is communicatively coupled with each mounting assembly 617 and is configured to control the same via delivery of one or more electrical signals thereto.

The rotors 606 of the illustrated aircraft 600 are mounted to the arms via automated rotor mounting assemblies 618, which can automatically rotate the axis of rotation of the rotors 606. The conditions for such rotation have been discussed previously, and may also be discussed further below. The system controller 613 is communicatively coupled with each mounting assembly 618 and is configured to control the same via delivery of one or more electrical signals thereto.

In the illustrated embodiment, the aircraft 600 includes a rotatable or pivoting platform 633 to which the flight controller 611 is physically mounted. The platform 633 can be mounted to any suitable region of the aircraft 600, such as any suitable portion of the fuselage. A pitch of the platform 633 can be physically controlled by an electromechanical mechanism, such as a servo or stepper motor. The system controller 613 is communicatively coupled with the control mechanism of the platform 633 and can control the angle of the platform via delivery of one or more electrical signals thereto.

A plane may extend through all of the rotors 606. For example, if the axis of rotation of each rotor 600 is vertical, the plane may extend or orthogonally through the axis of rotation of each rotor 600 (and/or through the rotors themselves). The flight controller 611 can be mounted such that it is on the same plane as the rotors, or such that it is on a plane that is parallel to the rotors. Stated differently, or otherwise, in some embodiments, the flight controller 611 can be mounted on a plane that runs orthogonally through an axis of rotation of one or more of the rotors 600. In instances where the rotors 606 are not rotated, but instead resemble the mounting of a traditional multicopter, the flight controller 611 can operate the rotors 606 in a typical fashion.

The flight controller 611 can be mounted so as to tilt in unison with the rotors 606. Stated otherwise, the controller 611 can be mounted so as to be selectively rotated to match a pitch of the selectively rotatable or tiltable rotors 606. Tilting of the controller 611 can be achieved in any suitable manner, such as via one or more servos or other devices that operate in unison with the servos or other devices that adjust the pitch of the rotors 606. In certain embodiments, tilting the flight controller 611 to match the tilt of the rotors 606 can permit use of a preprogrammed flight controller that is optimized or otherwise programmed for use with a standard multicopter. In certain instances, it can be desirable for the flight controller 611 and the rotors to be mounted on the same plane to achieve this result. The flight controller can register a new "level," and can operate optimally for forward flight or for hover, depending on the configuration of the rotors. In other embodiments, rather than being mounted to a separate platform that tilts in unison with tilting of the rotors 606, the flight controller 611 can instead be directly mounted to one of the rotor mounting assemblies 618.

The system controller 613 can be configured to operate the aircraft 600 in a variety of different flight modes, and further, to transition the aircraft 600 between those flight modes. The system controller 613 can, for example, be in communication with a control unit 645 (e.g., a handheld remote control unit), which may be located remotely from the aircraft 600 (e.g., on the ground), or may be mounted onboard, or with dedicated onboard control instruments manipulable by a pilot. The control unit 645 may be used to direct the system controller 613 operate in or transition between the various flight modes.

Various examples of flight modes include takeoff, hover, landing, slow flight, forward flight, and high-speed forward flight. In many instances, many of the controls and the orientations of the various onboard control systems (e.g., mounting assemblies 617, 618, 624) may be similar among the takeoff, hover, landing, and slow flight modes.

For purposes of illustration, various flight modes will now be discussed, along with various transitions among those flight modes. Of course, many more transitions and flight modes than those discussed hereafter are possible and are contemplated by the present disclosure.

In certain instances, the aircraft 600 may begin in a takeoff or upward flight mode. In this mode, the system controller 613 may dictate that the engine 622, the wings 612, and the rotational axes of the rotors 606 (for purposes of brevity, in some instances, references to the rotors 606 generally may refer to the axis of rotation of the rotors) all be oriented vertically. Similarly, due to the vertical orientation of the rotors 606, the system controller 613 may likewise direct that the flight controller mounting platform 633 also be oriented vertically (i.e., that a surface normal of the platform be oriented vertically). As a command or direction (e.g., from a remote controller 645) is given to increase a speed of the takeoff, the flight controller 611 can increase the speed of the rotors 606 and/or the system controller 613 can increase a thrust of the engine 622. Decreases in speed in the takeoff or upward flight mode can similarly be achieved by decreasing the speed of the rotors 606 and/or reducing the thrust of the engine 622.

In certain instances, the aircraft 600 may transition from the takeoff or upward flight mode to a hover mode. The controllers 611, 613 can maintain the rotors 606, the platform 633, and the engine 622 in the vertical orientation, and can reduce the speed of the rotors 606 and the thrust of the engine 622 until the aircraft 600 achieves a stable altitude. Moreover, the wings 612 can also be maintained in the vertical position. The controllers 611, 613 can determine that a stable altitude has been reached in standard manners, such as via information received from one of the inputs 641 (e.g., an altimeter).

In certain instances, the aircraft 600 may transition from the hover mode to a forward flight mode. The system controller 613 can direct rotation of the rotors 606 (via controls provided to the rotor mounts 618) and rotation of the flight controller platform 633 to achieve a forward component of thrust. In some instances, the flight controller 611 can direct an increased rotor speed and/or the system controller 613 can direct an increased thrust output from the engine 622. The system controller 613 can likewise rotate the engine 622 (via controls provided to the engine mount 624) to achieve a forward component of thrust. As forward speed is gained (as may be determined from the airspeed sensor 635), the system controller 613 rotate the wings 617 forward (via controls provided to the wing mounts 617).

In certain instances, the aircraft 600 may transition from the forward flight mode to a high-speed forward flight mode. The term "high-speed" is a variable term, and the speed at which this flight mode is achieved may vary from one circumstance or embodiment to the next. This flight mode may also be referred to as a locked mode, a locked forward flight mode, or as a wing-controlled flight mode. For example, in some embodiments, the control surface 690 of the wings are not used until the aircraft 600 has been transitioned to the locked or high-speed forward flight mode.

To transition to the high-speed forward flight mode from the forward flight mode, the system controller 613 can provide directions (e.g., signals) for the wing mounts 617 to rotate the wings 612 into a forwardmost orientation, to the extent they are not already in this position. For example, the wings 612 may be substantially horizontal, relative to the aircraft 600. That is, the wings 612 may be rotated, in some embodiments, a full 90 degrees from an initial vertical orientation.

The system controller 613 can rotate the rotors 606 to a forwardmost orientation, i.e., via signal delivery to the rotor mounts 618. For example, if the rotors 606 are delimited to a 90 degree forward rotation, the rotors 606 may be positioned a full 90 degrees from their vertical starting position. In some instances. the flight controller 611 can be deactivated or otherwise preempted (e.g., in some embodiments, the system controller 613 takes over operation of the rotors 606, such as to control their speed), as the rotors 606 may not be used as control surface devices in this flight mode. In other instances, one or more of the rotors 606 may still be used for stabilization in this flight mode. For example, in some embodiments, one or more of the rotors 606 may not be positioned fully forward in this flight mode, e.g., for maximum speed.

The engine 622, if not already in a forwardmost position, is also transitioned to the forwardmost orientation to achieve maximum forward thrust. In some embodiments, the engine 622 may be substantially horizontal in this flight mode.

Once the foregoing orientations of the various aircraft components are in place, the system controller 613 can operate the control surface 690 of the wings 612. In some instances, control of the aircraft 600 can resemble control of a fixed wing aircraft in this flight mode.

To transition to the hover mode, a vertical downward mode, or a landing mode from the high-speed forward flight mode, all of the controls can operate in the reverse order of the sequence just described.

In certain instances, the system controller 613 can use information received from one or more of the inputs 641, 643, 645, 635, from the flight controller 611, and/or from any of the other system components to which it is communicatively connected (e.g., the mounts 617, 618, 624) to control operation of the aircraft 600. For example, in some instances, the system controller 613 may automatically transition the aircraft 600 from one of the flight modes described above to a flight mode in which the wings are rotated upwardly based on data received from the airspeed sensor 635, as discussed more fully below. In other instances, the system controller 613 can determine how much thrust the engine 622 should produce based on operational parameters of the rotors 606. For example, the system controller 613 can reduce an amount of power used by the rotors 606 to maintain a given altitude by effectively reducing the load on the rotors 606 with increased vertical thrust. The controller 613 may base this control on information received, e.g., from the flight controller 611.

Any suitable algorithms may be used on the information received from the various data sources to implement flight controls. The algorithms may be implemented by a computer and/or dedicated hardware. In general, at least some portions of the subject matter disclosed herein may be described herein in terms of various functional components and processing steps. A skilled artisan will appreciate that such components and steps may be implemented as any number of hardware or software components or combination thereof configured to perform the specified functions. For example, an exemplary embodiment may employ various graphical user interfaces, software components, and database functionality.

For the sake of brevity, conventional techniques for computing, data entry, data storage, networking, and/or the like may not be described in detail herein. Furthermore, the connecting lines shown in various figures contained herein (e.g., FIG. 17) are intended to represent exemplary functional relationships and/or communicative, logical, and/or physical couplings between various elements. A skilled artisan will appreciate, however, that many alternative or additional functional relationships or physical connections may be present in a practical implementation of a system or method for controlling flight of the aircraft 600.

Additionally, principles of the present disclosure may be reflected in a computer program product on a computer-readable storage medium having computer-readable program code means embodied in the storage medium. Any suitable tangible, nontransitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including implementing means which implement the function specified. The computer program instructions may also be loaded onto a computer or other programmable data processing apparatus to cause a series of operational steps to be performed on the computer or other programmable apparatus to produce a computer-implemented process, such that the instructions which execute on the computer or other programmable apparatus provide steps for implementing the functions specified.

Thus, various algorithms discussed hereafter can readily be performed by the system controller 613. In some instances, the system controller 613 can control an amount of thrust supplied by the engine 622 based on information regarding a speed of the rotors. This control may, in some instances, only be performed when the aircraft 600 is not operating in the high-speed forward flight mode.

In some embodiments, the flight controller 611 can provide information to the system controller 613 regarding rotor speed for each of the rotors 606. This information may be in the form of, e.g., current draw or other suitable electrical indicators of rotor speed. In some instances, the flight controller 611 may immediately act on the information. In other instances, the flight controller 611 may monitor the information over a period of time and then act on a time-averaged version of the data. In either case, the flight controller 611 can determine which of the rotors is drawing the least current, or stated otherwise, is spinning the slowest. Given that some amount of the rotor thrust is being used to counteract gravity on the payload, it can be safe to supplement thrust by an amount that does not completely overpower the slowest rotor. Stated otherwise, it may be desirable for there to be at least some draw, or some load, on each of the rotors 606 so that the rotors 606 can continue to be used effectively as control surfaces or, stated otherwise, so that the flight controller 611 can continue to operate as normal.

Accordingly, the system controller 613 may instruct the engine 622 so provide sufficient thrust to reduce the speed of the slowest rotor. However, the controller 613 may also ensure that the reduction is by no greater than a fixed percentage of the starting value of the rotor speed, in order to ensure that a load remains on the rotor.

In one illustrative embodiment of a method that the aircraft 600 can employ to control the thrust of the engine 622, the system controller 613 receives information representative of the rotation speed of each of a plurality of rotors of the aircraft 600. The controller 613 then determines the speed of the lowest rotor and calculates a threshold percentage thereof. The controller 613 further instructs the engine 622 to increase its thrust. The controller 613 monitors the rotor speeds by continuing to receive representative information from the flight controller 611. Once the lowest rotor speed has been reduced to the threshold value, the controller 613 instructs reduction of the thrust.

As another illustrative example, the controller 613 can use airspeed information in its control of wing orientation. For example, the controller 613 may have a preset airspeed value stored therein. As the aircraft 600 increases speed, once the aircraft 600 reaches the preset value, the controller 613 may rotate the wings 612 to a fully forward orientation for high-speed flight mode. These examples are merely illustrative.

Figure 18:
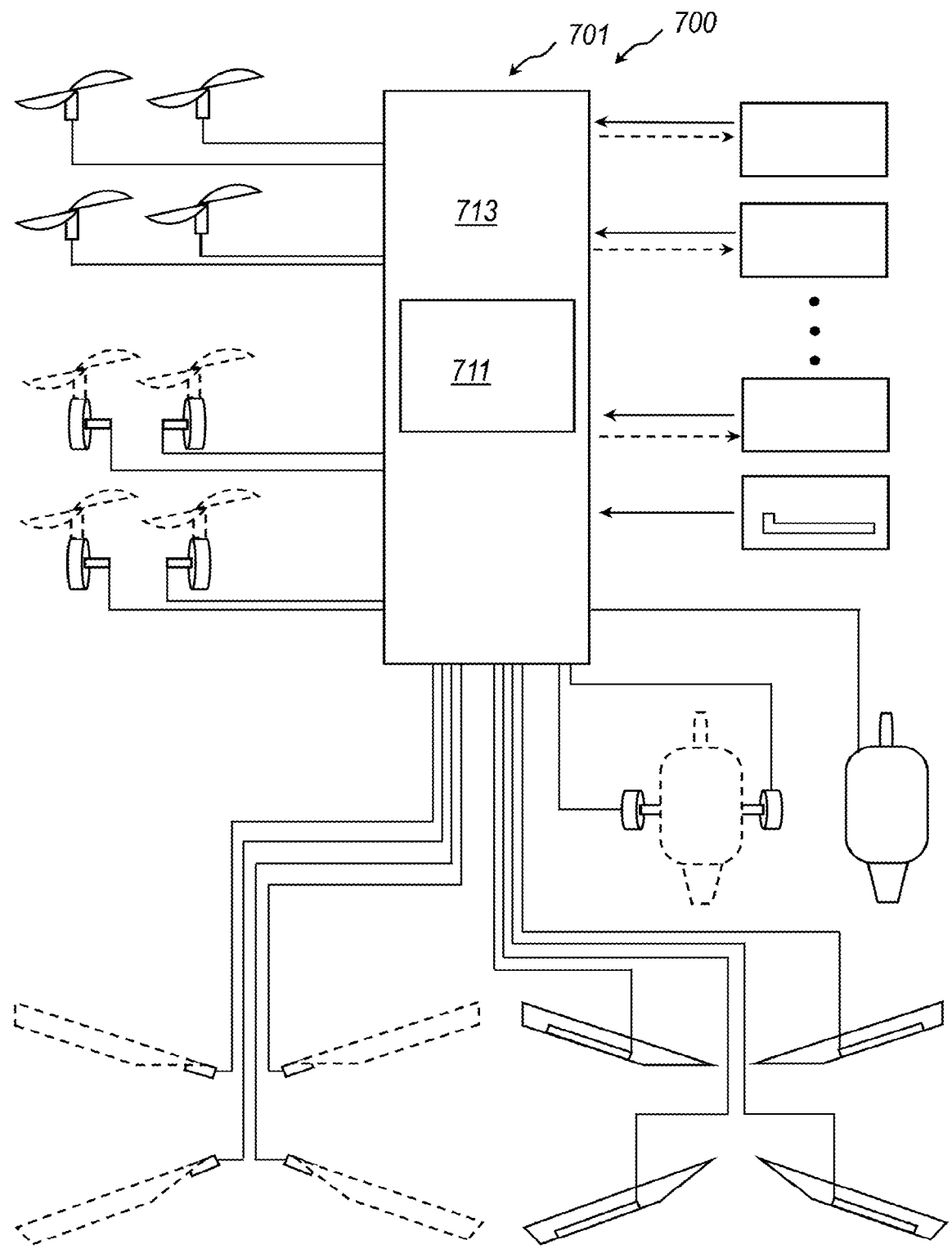
FIG. 18 is a schematic diagram of another embodiment of a control system of another embodiment of a multi-rotor aircraft.
Figure 19:
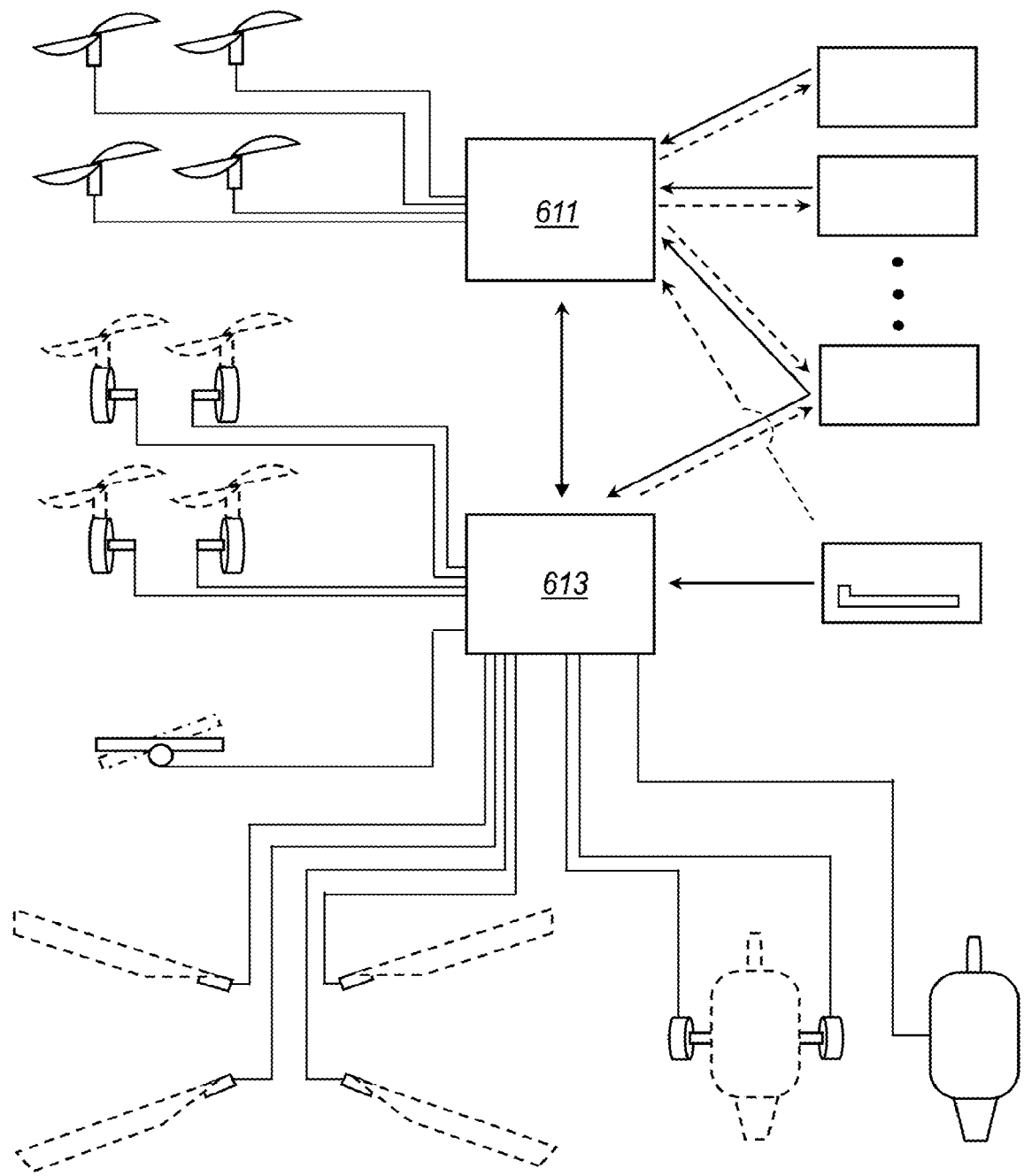
FIG. 19 is a schematic diagram of another embodiment of a control system of another embodiment of a multi-rotor aircraft.
Figure 20:
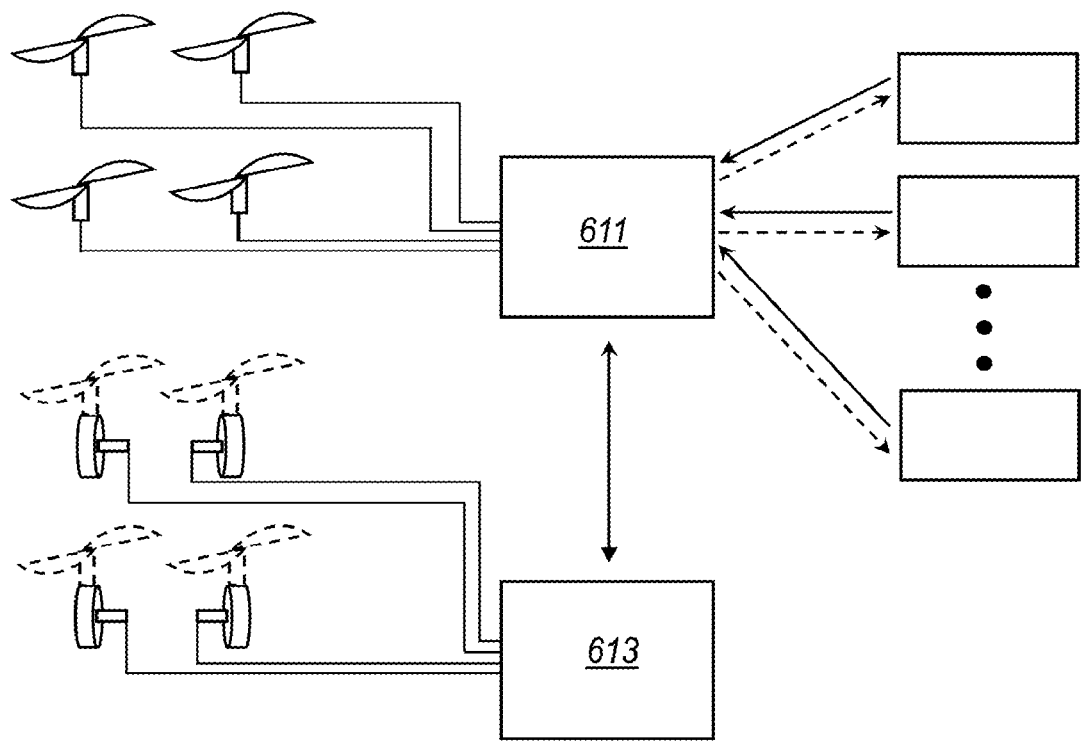
FIG. 20 is a schematic diagram of another embodiment of a control system of another embodiment of a multi-rotor aircraft.
Figure 21:
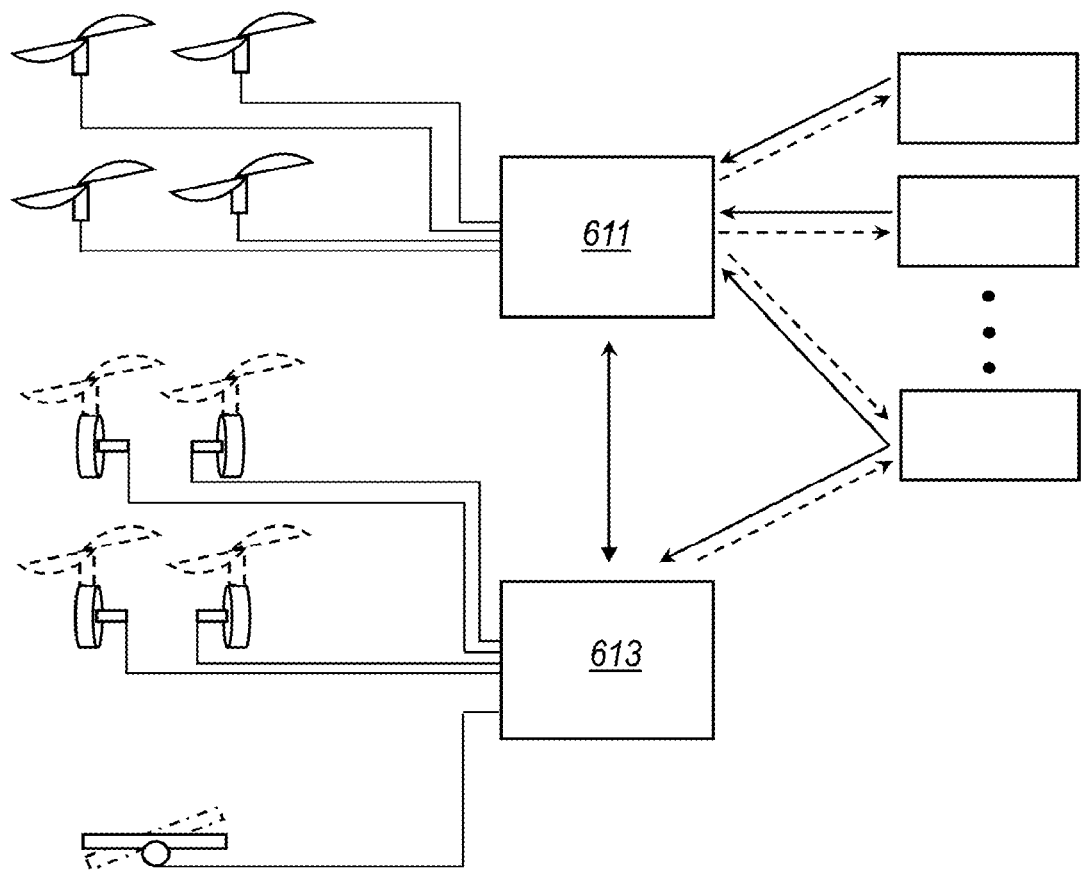
FIG. 21 is a schematic diagram of another embodiment of a control system of another embodiment of a multi-rotor aircraft.
Figure 22:
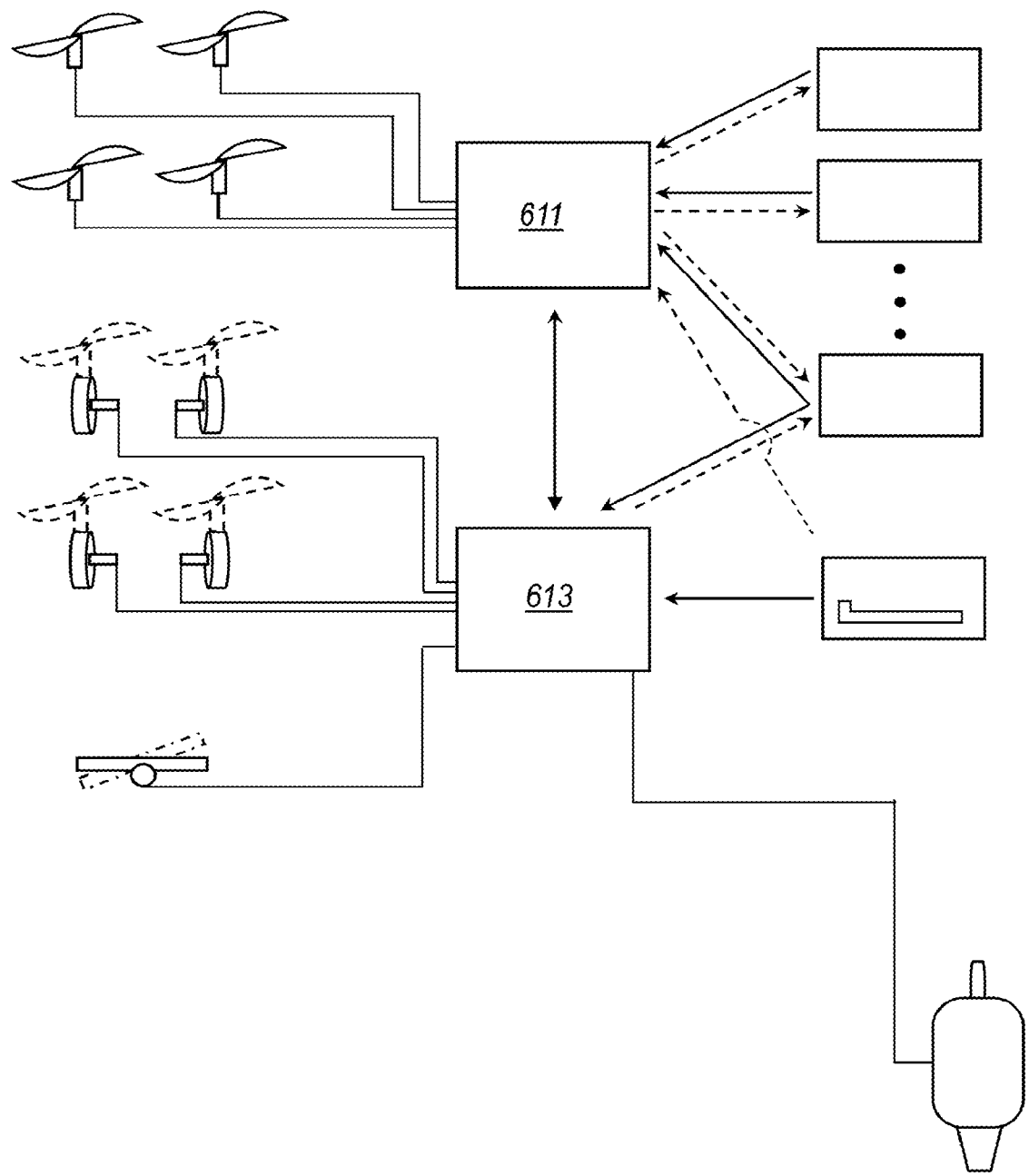
FIG. 22 is a schematic diagram of another embodiment of a control system of another embodiment of a multi-rotor aircraft.
Figure 23:
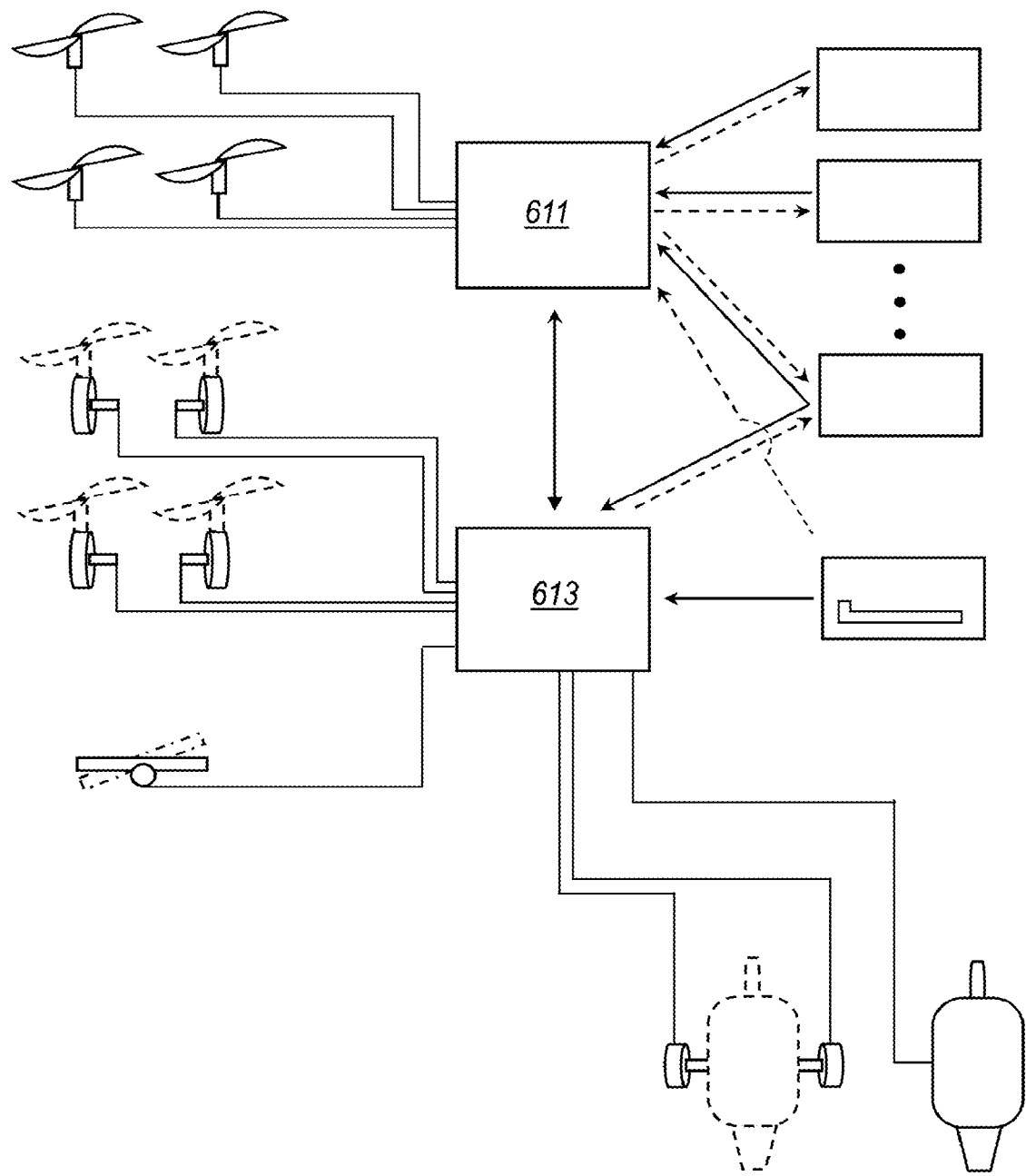
FIG. 23 is a schematic diagram of another embodiment of a control system of another embodiment of a multi-rotor aircraft.
Figure 24:
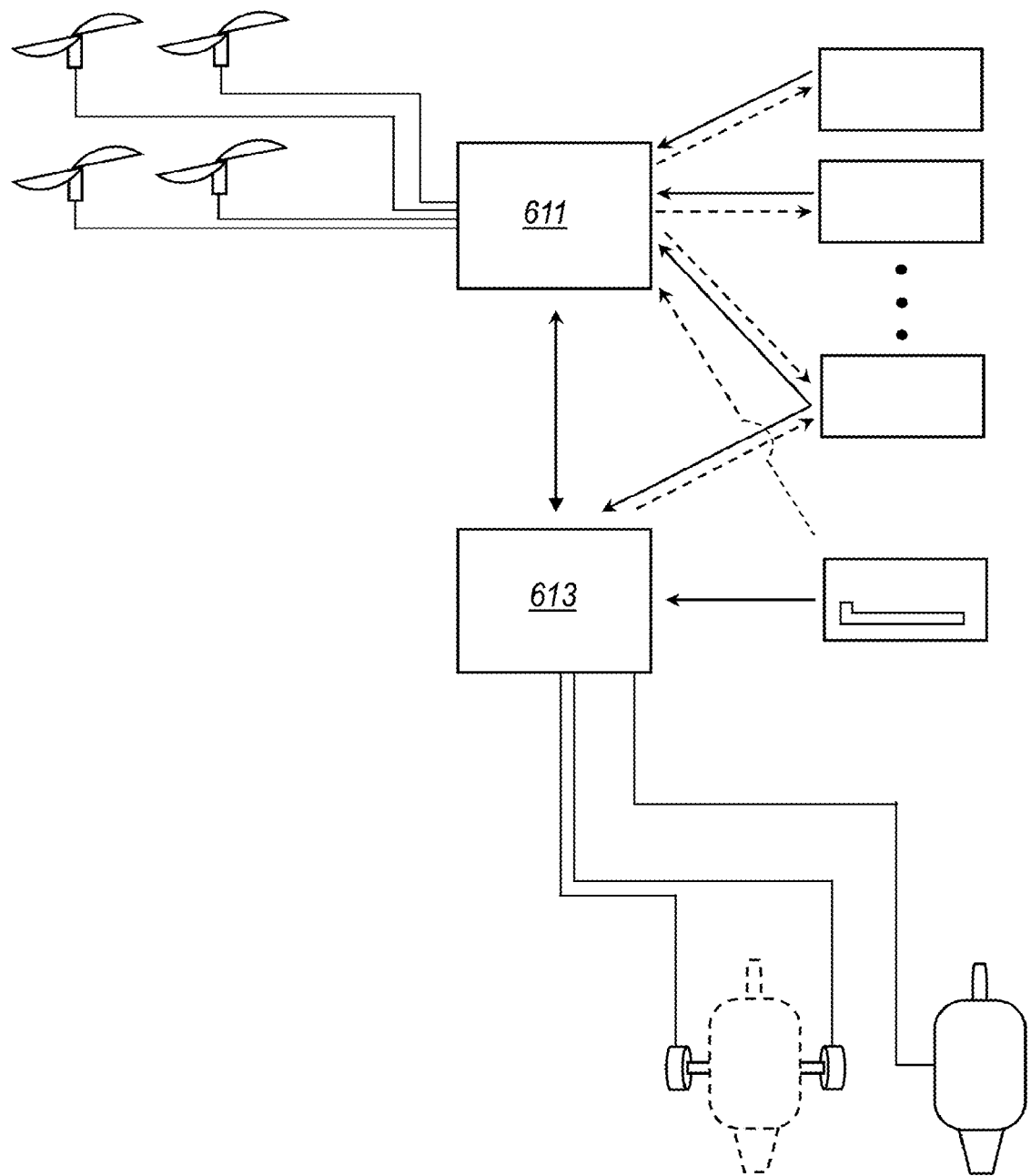
FIG. 24 is a schematic diagram of another embodiment of a control system of another embodiment of a multi-rotor aircraft.
Figure 25:
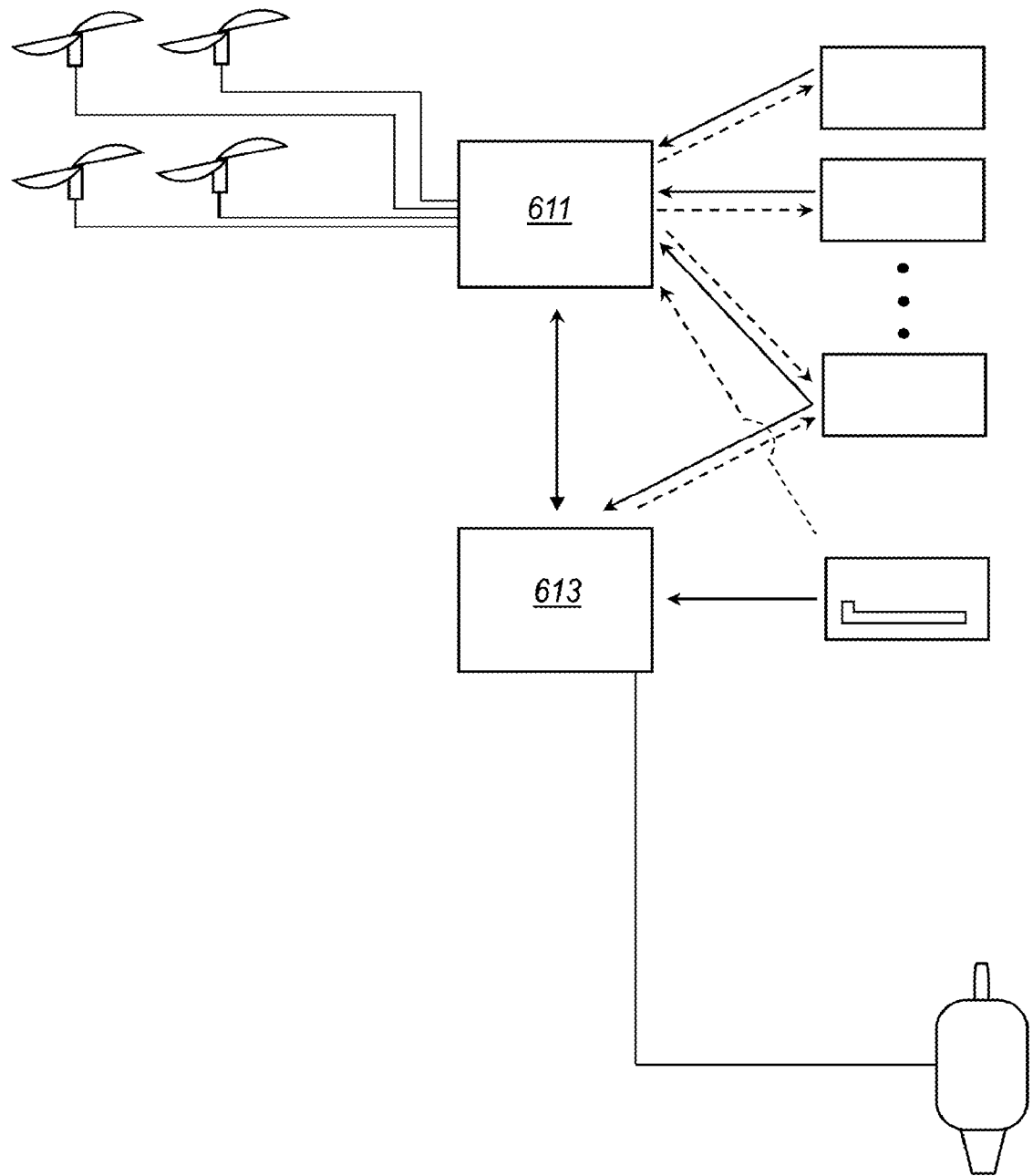
FIG. 25 is a schematic diagram of another embodiment of a control system of another embodiment of a multi-rotor aircraft.
Figure 26:
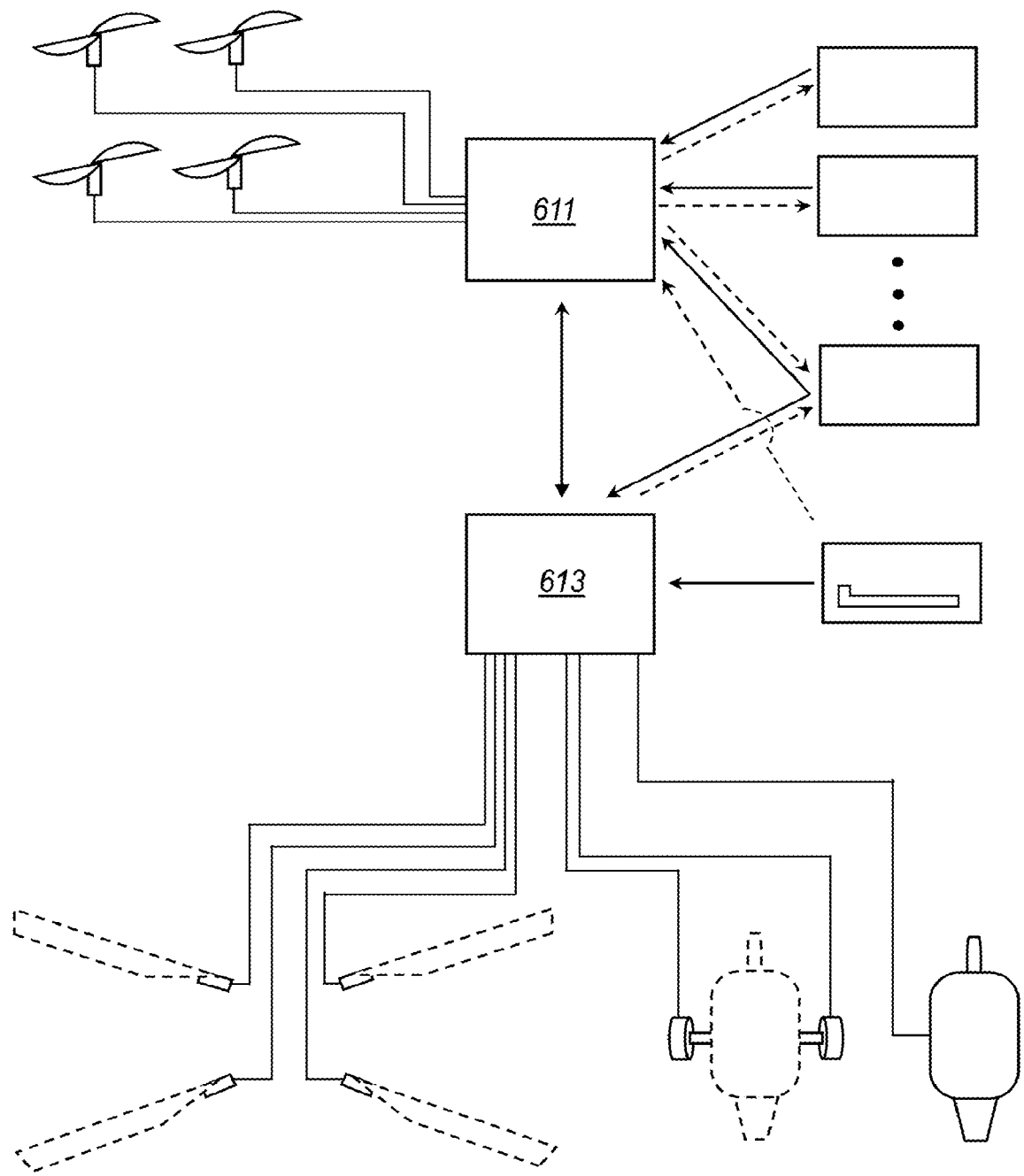
FIG. 26 is a schematic diagram of another embodiment of a control system of another embodiment of a multi-rotor aircraft.
Figure 27:
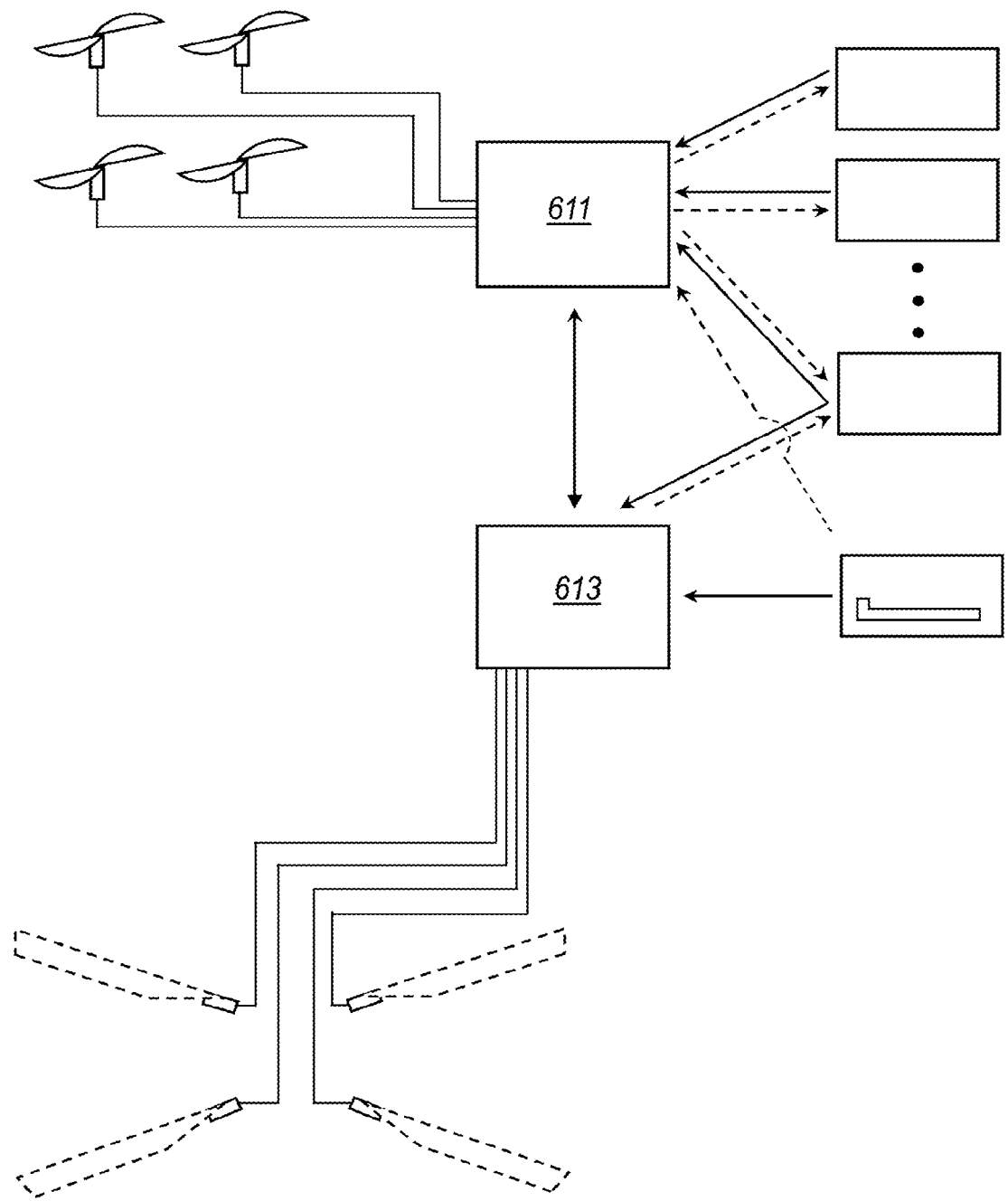
FIG. 27 is a schematic diagram of another embodiment of a control system of another embodiment of a multi-rotor aircraft.
Figure 28:
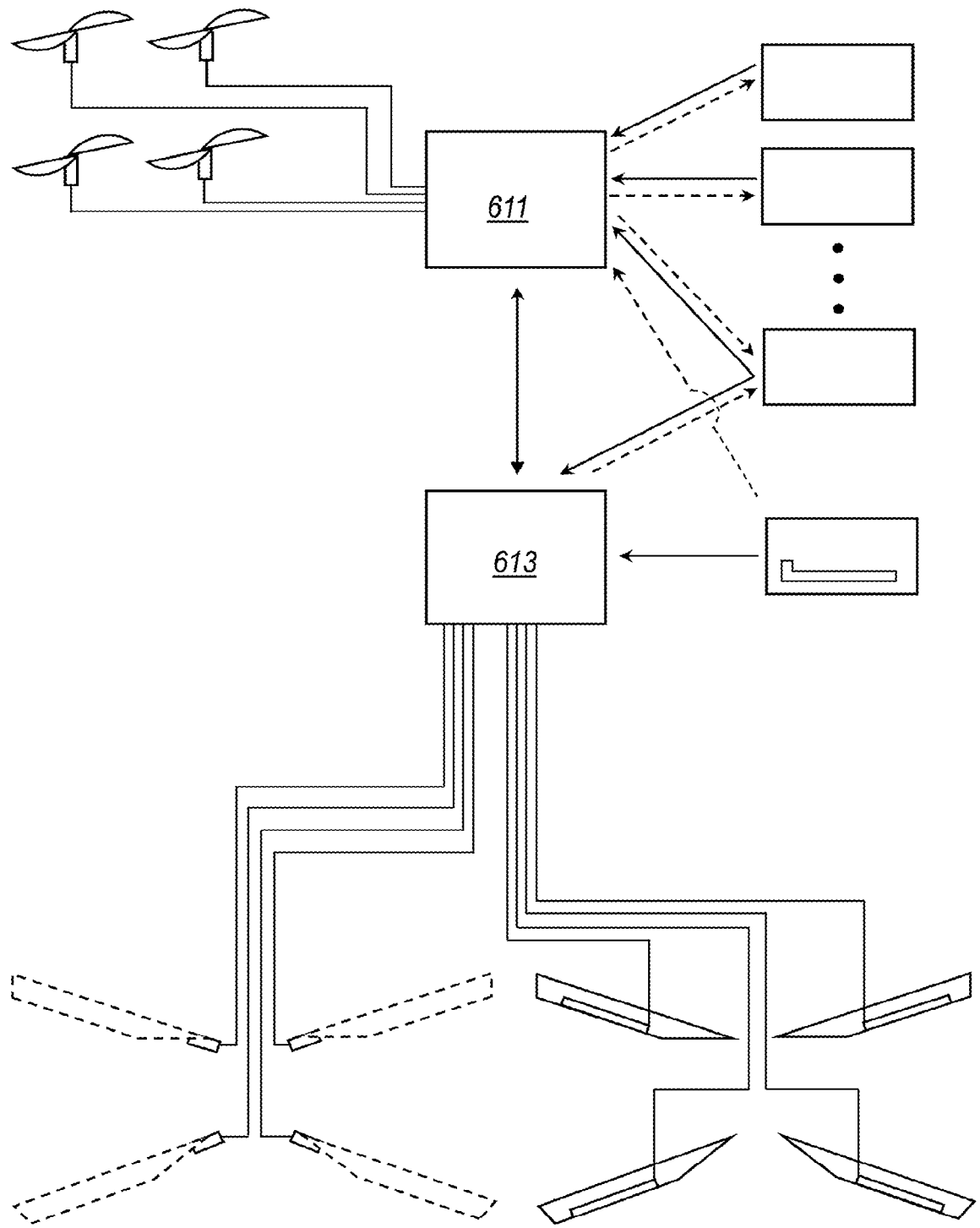
FIG. 28 is a schematic diagram of another embodiment of a control system of another embodiment of a multi-rotor aircraft.

FIG. 18 depicts an embodiment of a control system 701 of an aircraft 700. The control system 701 resembles the control system 601 discussed above in many respects. However, the control system 701 does not include a rotating platform to which a flight controller is mounted. Moreover, rather than using a commercially available or off-the-shelf flight controller, the control system 701 includes a dedicated flight controller 711 configured to operate based on inputs from the additional control features (e.g., automated mounts) of the aircraft 700. The flight controller 711 can by a subsystem of a more general dedicated system controller 713. Also, speaking more generally with respect to the controllers 611, 613 of the aircraft 600, the controllers 611, 613 may be collectively referred to as a controller, or as a control system, of the aircraft 600.

In the illustrated embodiment, the system controller 713 can be attached to the aircraft in a fixed configuration. For example, the controller 713 can be attached in a substantially horizontal configuration when the rotors are level (e.g., not tilted). In some embodiments, the controllers 711, 713 may be configured to utilize information regarding the amount of tilt of the rotors and to use this information to adjust flight parameters. The controllers 711, 713 thus may account for the tilting of the rotors to provide optimal flight controls for different flight states, such as the hover state or the forward flight state.

As previously discussed, any suitable permutation of any or all of the features described herein is contemplated by the present disclosure. Any embodiment can be constructed from any of the disclosures herein. Stated otherwise, each feature can be generalized and applied to any other embodiment.

FIGS. 19-28 provide various illustrations of this point. In particular, these drawings depict examples of multi-rotor aircraft and their associated control systems that do not include every feature disclosed with respect to the aircraft 600, as discussed with respect to FIG. 17. These figures provide express support for aircraft similar to the aircraft 600, but that do not include each of its systems. Although the illustrated control systems include separate controllers 611, 613, such as the controllers discussed with respect to FIG. 17, it should be understood that in other embodiments, a dedicated and/or comprehensive system controller, such as the system controller 711 discussed with respect to FIG. 18, could instead be used.

Figure 29:
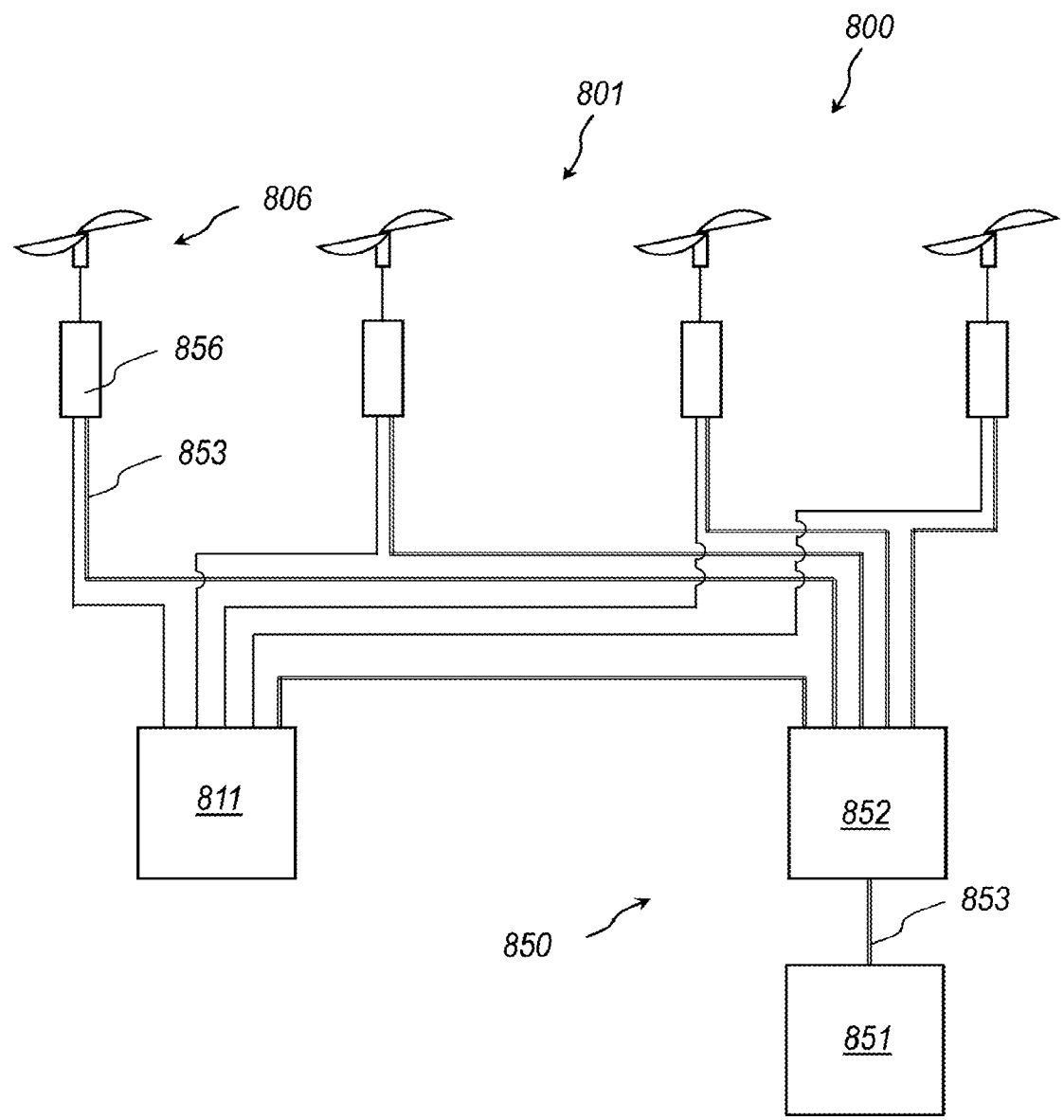
FIG. 29 is a schematic diagram of embodiments of control and power systems of another embodiment of a multi-rotor aircraft.

FIG. 29 is a schematic diagram of another embodiment of an aircraft 800, or more particularly, of a control system 801 and a power system 850 thereof. The control system 801 can be similar to other control systems described herein. In the illustrated embodiment, the control system 801 only includes control of system of rotors 806. In some instances, the aircraft 800 does not include an engine or controllable wings. Rather, the aircraft 800 may include passive wings that provide supplemental lift during forward flight, according to free-wing principles.

In the illustrated embodiment, each rotor motor is controlled by its own speed controller or electronic speed controller (ESC) 856. In the illustrated embodiment, the ESCs 856 are connected in parallel to a positive and negative lead which can be traced back to power management system 852 of any suitable variety, which may include a battery bus. Any other arrangement is contemplated.

More generally, the power system 850 can include the power management system 852 of any suitable variety. The power management system 852 can be electrically coupled with a power source 851 in any suitable manner. The power source 851 can comprise one or a plurality of batteries (e.g., rechargeable batteries). The electrical connections 853 may be of any suitable variety (e.g., electrical wires or cables). The power management system 852 may provide power to the ESCs 856 and to a system controller 811.

Figure 30:
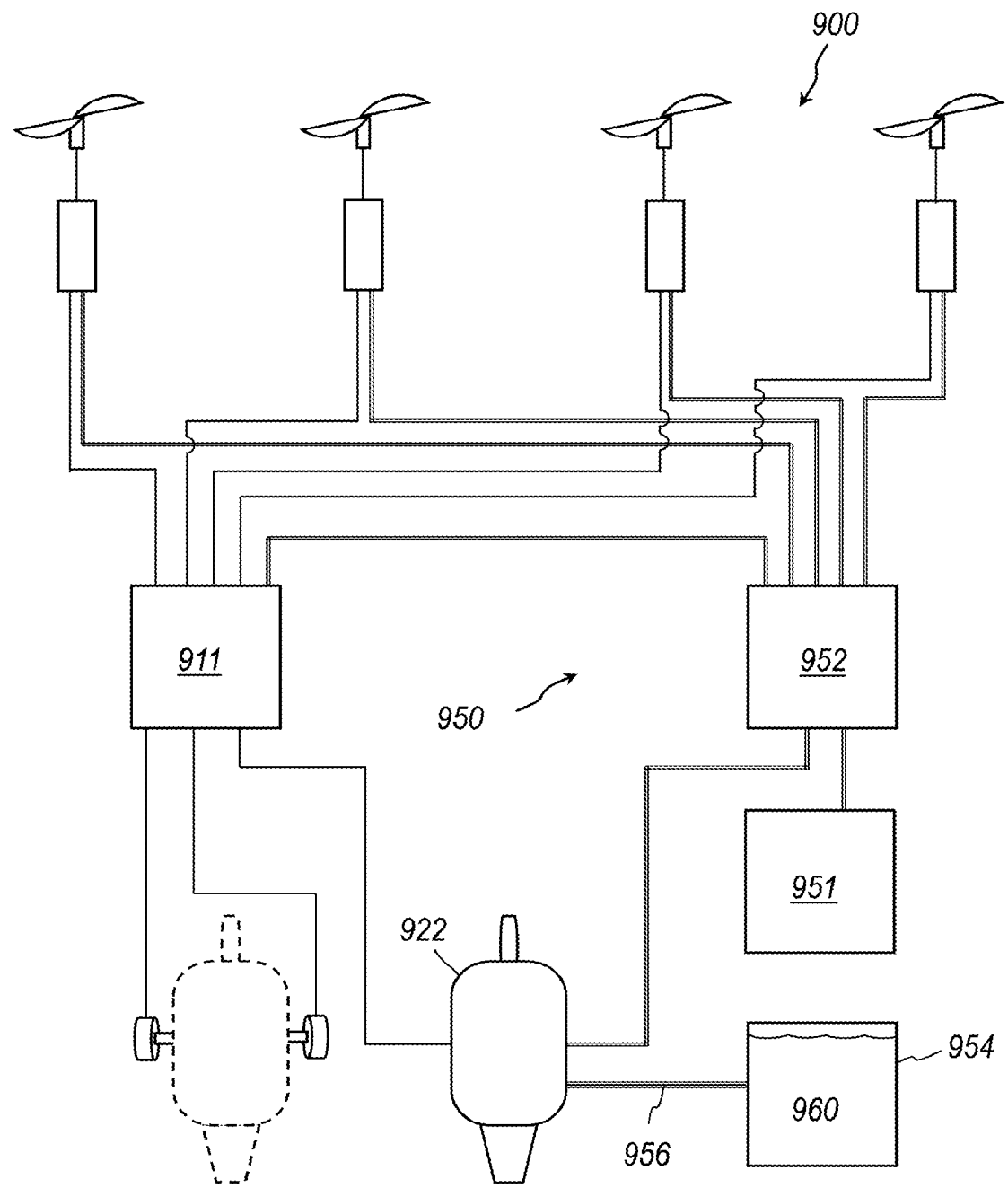
FIG. 30 is a schematic diagram of embodiments of control and power systems of another embodiment of a multi-rotor aircraft.

FIG. 30 is a schematic diagram of another embodiment of an aircraft 900, including a power system 950 thereof. The power system 950 can be a hybrid. The power system 950 can include a battery-based power source 951 such as previously described. An engine 922, which may be used to provide thrust for the aircraft 900, can further provide electrical energy by way of a generator. The engine 922 is thus electrically connected to the power management system 952. As illustrated, a system controller 911 is coupled with the engine 922 to control operation thereof. As previously noted, the aircraft 900 includes a fuel bladder 954 with a combustible fuel 960 therein, which is provided to the engine 922 via a fuel line 956.

The following disclosure includes reiterations of features already described and/or recites additional information, which may be apparent from the foregoing disclosure. The following disclosure describes a variety of nonlimiting embodiments which may resemble embodiments previously disclosed.

In some embodiments, an electrical system of a multi-rotor aircraft is augmented with a fossil fuel system, which can increase the total energy carried onboard the aircraft. In some embodiments, the electrical system is augmented by fossil fuel motors that are placed near the aircraft's center of gravity. The motors supplement lift without interfering with the quick-response capabilities of the electrical motors, which are used to stabilize and control the aircraft. In further embodiments, electrical generators can be added to the fossil fuel motors to further extend the electrical energy available on the aircraft without increasing the size of the batteries that may be carried onboard the aircraft.

Due to the low energy density of batteries, it can be desirable not to use batteries as a sole source of energy for an aircraft, such as a traditional quadcopter. For example, in may be desirable to use fossil fuel engines to supply supplemental thrust and/or electricity to the propulsion system.

In various embodiments, control of the flight controller may be coupled with propellers, one or more mechanisms that alter the angular orientation of the motors, the jet engine, and/or one or more mechanisms that alter the angular orientation of the jet engine. In many embodiments, the flight controller may control some or all of these components to achieve stabilized and/or efficient flight. For example, in some embodiments, the rider may be able to manually control the direction of flight (e.g., pitch, yaw, roll), and the controller will coordinate the speed and/or orientation of the rotors and/or will coordinate the magnitude and/or direction of thrust provided by the jet engine to achieve the manually demanded direction. In other or further embodiments, the quadcopter or other multi-rotor aircraft may be capable of fully automated flight (e.g., autopilot or waypoint navigation).

The rotor assemblies may be tilted about their respective rotational axes to achieve a desired flight configuration. For example, the assemblies may all be tilted by the same amount in a forward direction to achieve and/or optimize forward flight; the assemblies may all be tilted by the same amount in a rearward direction to achieve and/or optimize rearward flight, and/or the assemblies may all be arranged in a non-tilted configuration (e.g., in a vertical orientation) to achieve and/or optimize liftoff, landing, or hovering flight.

In some embodiments, the aircraft includes wings. The wings can be attached to or otherwise coupled with the spars. In further embodiments, the wings are configured to pivot or rotate about the spars to achieve different flight configurations. In some embodiments, the spars are substantially cylindrical, which can facilitate rotation of the wings about the spars, in some instances. The wings can change pitch by rotating about the spars.

The orientations of the propellers, wings, and/or engine may be optimized for energy efficiency in the liftoff or hovering flight modes.

A central or core frame, such as the frame of a fuselage, can be coupled to a combustible fuel (e.g., fossil fuel) powered jet engine at an underside thereof, and can be configured to seat or otherwise accommodate the rider at an upper side thereof. The engine can be tiltable or rotatable in manners such as previously disclosed, all while the rider remains substantially in the same seated or mounted position relative to the frame. In some embodiments, the rider is seated in a substantially prone or crouched position when transported by the multi-rotor aircraft. For example, the rider can substantially resemble the same seated orientation as a rider of a motorcycle. The rider's legs may substantially straddle a portion of the frame and/or the engine.

In some instances, such an arrangement can yield a center of mass (COM) of the full system (e.g., aircraft and rider) that is substantially at an intersection point of the arms of the X shape. For example, the center of mass of the system, when the rider is mounted on the quadcopter can be substantially at the vertical and horizontal midpoints and can be substantially at the vertical midpoint in the plane. The location of the center of mass of the system may vary somewhat depending on the weight and/or height of the rider, but these variances can be adjusted for by the flight controller. In some instances, arrangements in which the rider encompasses or is substantially wrapped around a center-of-mass of the system can provide a relatively smooth ride for the rider. It can provide a balanced system that is relatively stable and can be controlled with minor adjustments to the speed of the rotors, the rotational orientation of the rotors, the thrust of the engine, and/or the rotational orientation of the engine.

In some embodiments, the rider can wear a harness (e.g., over or under a flight suit), which may have a pin (e.g., which could be released under tension), a clip, or any other suitable mechanism for securing the rider to the frame. The rider may release from the frame if desired, such as for an emergency egress. The illustrated embodiment in FIG. 1 can be particularly advantageous for such emergency egress situations, as the rider is positioned generally above and rearward of the jet engine (or engines), and is spaced away from the propellers. The rider thus generally has a direct or unobscured egress pathway.

Other seating configurations are contemplated. Moreover, any suitable cushioning, harnessing, or other accommodations for the rider can be coupled to the frame in any suitable manner. Further, in the illustrated embodiment in FIG. 1, the rider may be exposed to the environment during flight. In other embodiments, the rider may be encompassed by a cabin that is coupled to the frame.

As previously noted, the rider may assume a crouched or prone pose. The rider's position may be optimized for ergonomic, ease-of-use, and/or other considerations. For example, in some embodiments, a rider may assume a position that will provide the greatest comfort, visibility, and/or intuitive feel. In some embodiments, the seating arrangements of the quadcopter can be adjustable for differently sized riders.

As previously noted, some wings are capable of freely rotating about spars to which they are mounted, or can freely rotate within a predetermined range of angles (e.g., 0 to 90 degrees). According to the free-wing concept, each wing is allowed to rotate freely about its respective spar. The wind or air currents (e.g., from flight) tilt the wing to an optimal pitch attitude (e.g., a lowest-energy state). In such embodiments, each wing can operate independently of the other wings, and may have no control surface associated with it. The wings can rotated to a position that supplies additional lift with forward motion of the aircraft. As the airstream passes over the wing the wing will naturally weathervane, or adjust itself to the path of least resistance.

For example, in some embodiments, the wing naturally adjusts to the downwardly tilted position during upward travel of the aircraft. During such travel, the air currents moving past the wing urge it to the position of least resistance.

The wing can naturally transition to a substantially horizontal configuration during forward flight. Due to the airfoil shape of the free wing, the wing can generate lift, which can lessen the load supported by the rotors. In some embodiments, the rotor assembly is rotated approximately 90 degrees about the rotational axis thereof, such that each rotor rotates about a substantially horizontal axis. The thrust generated by the rotors may be substantially backward, and the lift for maintaining the aircraft airborne in a substantially forward flight path may be achieved via the wing.

In other instances, the wings may not provide all of the lift for the aircraft. The rotor assembly may be pitched by a smaller angle (e.g., less than 90 degrees), such that some component of the thrust generated by the rotors achieves forward movement, while another component thereof maintains (or assists in maintaining) the aircraft in an airborne state.

In some embodiments, when the aircraft is hovering, the wings will naturally point upward in the direction of the relative wind produced by the motors. When the wings weathervane into the relative wind in this manner, it can reduce the flat plate drag of the wing encountering rotor wash. As the aircraft begins to move forward the wings can level out and generate lift for the aircraft.

In other embodiments, the pitch of the wings may be altered in other manners. For example, in some embodiments, mechanical actuators may be used to actively achieve the different configurations just described, rather than merely permit the wings to assume these configurations in a passive manner. For example, each wing may be equipped with a manual actuator to control the movement thereof to change the pitch of the wing. Use of mechanical actuation may be advantageous in some instances, as it can provide greater predictability to the wing position, while retaining the advantages of a free-wing-type pitch adjustment system. In either case, tiltable wings, as used with a multi-rotor aircraft, can increase lift during forward flight, thereby reducing energy consumption to produce lift. Moreover, the tiltable wing concept has the added advantage of reducing drag while in a hover mode.

In some embodiments, each wing includes a solid core composite construction. The proximal and distal ends of each wing can be cut at angles that optimize the airfoil for a particular direction of travel. For example, as can be seen in FIG. 15, the illustrated wing is configured to be attached to a spar of an X-shaped aircraft. The leading and trailing edges of the wing extend at an angle relative to a longitudinal axis of the aircraft, whereas the inner and outer edges may be parallel to the longitudinal axis. In some embodiments, the wings may be equipped with one or more power sources, such as batteries, and/or fuel.

In some embodiments, the wing includes a channel that extends under the center of lift from the inner side of the wing to the outer side. This channel can accommodate a cylindrical wing spar to facilitate rotation of the wing relative to the spar. In some instances, the channel wall of the wing may interface directly with the outer surface of the cylindrical spar and may rotate thereabout. In other embodiments, one or more friction reducing elements may be used. For example, in some embodiments, the channel may be equipped with bearings to reduce friction between the wing spar and the wing. The wing spar may be substantially fixed, relative to the aircraft as a whole, whereas the wing rotates relative to the spar.

In certain embodiments, when the aircraft is no longer dependent on the rotor system to maintain flight, the operator can then tilt the rotor system forward to increase thrust in the lateral (e.g., horizontal, as opposed to vertical) direction. Increasing thrust in the lateral direction increases aircraft speed and airflow over the wings, which reduces the weight carried by the rotor blade system.

In some embodiments, a supplemental thrust system can include one or more jet engines mounted on sliding tracks underneath the center of the aircraft. The tracks can facilitate positioning the engine relative to the center of gravity of the aircraft. The one or more jet engines can produce one single column of thrust, near the center of gravity of the aircraft. For heavier applications, larger jet engines can be used, and/or additional jet engines can be added.

In certain embodiments, a supplemental lift device (e.g., a fossil fuel jet engine) is coupled to an aircraft frame via a rotation system configured to reorient the direction of thrust provided by the device. For example, in some instances, the supplemental lift system is allowed to change pitch at high forward speeds, such as speeds where lift is supplemented by wings or some other means, the supplemental lifting jet will effectively convert the high energy for vertical lift used for hovering into forward thrust for speed. Increasing speed, without increasing energy consumption, can increase the aircraft's range.

In some embodiments, a jet engine is mounted at a 30 degree angle, relative to vertical, for hover flight. Such an arrangement can result in the aircraft hovering in a nose-up pitch attitude. Further, the jet engine can then be pitched down an additional 45 degrees (e.g., 75 degrees from vertical) for forward flight. One embodiment of a jet engine suitable for use with certain aircraft is an AMT Olympus HP. This is just one illustrative example.

It can be advantageous to use such a supplemental thrust device to significantly reduce the work load on the electric motors. That is, the supplemental thrust device can reduce the weight carried by the electric motors. The electric motors can then be used primarily for stabilization purposes, rather than lifting purposes, such as during liftoff. Reducing the lifting burden on the electric motors dramatically reduces electrical energy consumption, thereby increasing endurance for a given amount of battery.

In some instances, use of a supplemental lifting system can also increase the safety of a multicopter by making the aircraft less susceptible to any one engine failure. Moreover, if the supplemental thrust device fails, the aircraft's range and endurance will be reduced, but a safe landing is still possible.

Further, in some embodiments, the relatively high-energy density fossil fuel motor can be used to generate additional electricity. Stated otherwise, the supplemental lift system can further function as a supplemental electrical energy system that may be used to power the rotors.

In some instances, use of a rotating jet engine will produce gyroscopic precession, torque, and/or temporary undesirable thrust vectors. These effects may reduce stability, but may be overcome by the stabilizing/lifting electric motors.

Ability to tilt the supplemental lifting system is optional. That is, in some embodiments, the engine is fixedly secured to the fuselage at a preset angle. In some instances, this angle is 0 degrees relative to the vertical.

Flight modes may be used when changing the pitch of the propulsion system. (In some instances, if a constant pitch attitude is used for all the propulsion sources and the flight controller is also on that same plane, there may be no flight mode differentiation.) After liftoff the aircraft can transition from a "landing mode" (which may also be referred to as a vertical mode) where motors are in vertical position and the aircraft is in a zero pitch attitude, to a "flight mode," where the motors are tilted forward and the flight controller is tilted forward an equal amount creating a new level for the aircraft resulting in a hover attitude of about 30 degrees nose up and a forward flight attitude of nearly zero degrees pitch. With the addition of the flight modes, landings will be flat, optimizing propeller clearance, visibility and rider comfort, and forward flight will also be optimized for aerodynamics, rider comfort, visibility and control.

Some embodiments include wings that weathervane into a level position and have no other purpose than to provide lift. Some embodiments, include wings that weathervane into a level position and then lock into place allowing flight controls to control the wing until it is unlocked for slow flight. Some embodiments include wings that are driven by an actuator motor in all phases of flight, and are programmed to position themselves in a level position for faster airspeeds and programmed to return to a vertical orientation at slower speeds.

In certain embodiments, the engine or engines (which, in some instances, may be one or more micro-turbines) is/are located near the center of gravity (COG) of the aircraft. This can minimize stabilization difficulties due to the presence of the engine(s).

In some embodiments, an aircraft draws fuel from an onboard fuel tank and receives automated commands from the flight controller based on the lowest drawing electric motor. In some instances, combustible fuel is much more energy dense than are batteries, and by using fuel, and aircraft's endurance and lifting capacity and each be improved by at least a factor of 3.

In some embodiments, motors are mounted on swivels which can be locked into place at a given angle, or rotate using stepper motors, servos, or other actuator type. In other or further embodiments, wings are mounted on each arm (spar). Each wing can either rotate freely, positioned by the air passing over it, and limited in its rotation by a "rotation limiter" at the base of each wing which limits a wing's rotation from, for example 0 to 90 degrees. The rotation of the wings can also be controlled using stepper motors, servos, or other actuators.

In some embodiments, flight controls are added to each wing. The flight controls activate above a certain speed when the wings lock into a flight mode (e.g., level with the aircraft, in a position similar to wings on a traditional fixed wing aircraft).

In certain embodiments, a turbine engine adds thrust to the aircraft lightening the aircraft, or bringing the aircraft close to a "neutral buoyancy" (using a scuba diver's reference). The turbine is mounted on a pivot, or swivel, similar to the pivot the wings are mounted to. The pivot can either be locked in place, e.g., at an optimal angle, or it can be actuated using stepper motors, servos, or other actuators.

In some embodiments, in slow flight conditions (e.g., below a flyable airspeed) the turbine will always be in the vertical position. As the aircraft transitions to higher speed the turbine will begin to tilt forward increasing the horizontal thrust.

In some embodiments, the aircraft include wings that are deployable in mid-air (e.g., spring forward) and lock into place.

Much of the foregoing disclosure is directed to multi-rotor aircraft and related methods and systems that pertain to transport of a single rider. For example, the single rider or pilot may, in some instances, sit prone, similar to a rider on a bullet bike or a horse. A variety of options are available for the specific seating or riding configuration for the rider. For example, any suitable arrangement of one or more seats, pads, or other seating devices is contemplated. The description may include references to a pilot or a rider. The present disclosure should not, however, be limited to single-operator or single-rider contexts. Indeed, the uses for the technologies disclosed herein are wide-ranging and encompass, for example, the entire multicopter industry. Although particularly advantageous for personal transportation vehicles, the present disclosure is far more widely applicable. For example, further applications embodiments disclosed herein include package delivery, autonomous transportation, multi-passenger aircraft, etc. The disclosed principles are scalable a variety of sizes and configurations. These and other applications can benefit from the longer range than a standard multicopter can deliver, as well as the ability to hover and/or perform spot landings that are not possible with fixed-wing aircraft.

In view of the foregoing, various embodiments are configured to optimize aerodynamics for forward flight using a tiltable propulsion system. Other or further embodiments increase flight range by utilizing wings which naturally optimize for forward flight or hovering. Still other or further embodiments supplement electrical power using fossil fuels and high efficiency engines which reduce the electrical load being used to produce lift. These and/or other features and advantages described herein can be of particular use with a variety of multi-rotor aircraft designs. For example, they may be of particular use in personal transporters, which may be used to transport a single rider, passenger or operator. As previously discussed, these advantages may be implemented in other contexts as well.

In some embodiments, operation of the supplemental lift system is virtually imperceptible to the operator. Increasing thrust on the electric motors will increase thrust on the supplemental lifting system. Decreasing thrust will have a corresponding decrease in thrust on both the electrically produced thrust and the supplemental lifting system. It can be desirable to have a slight pull or weight on the electric motors. For example, in some instances, the supplemental lifting system carries no more than about 95% of the aircraft's weight in a hover while the electric motors will carry at least about 5% of the aircraft's weight.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub routines or only a portion of a method illustrated in the drawings, such as a small subset of step, may be a separate method. Stated otherwise, some additional methods may include only a portion of the steps shown in a more detailed method.

Directional terms, such as "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. Some directional terms, such as vertical, lateral, etc., may be used in the reference frame of an aircraft, as will be clear from the context of this written description.

References to approximations are made throughout this specification, such as by use of the terms "substantially," "about" or "approximately." For each such reference, it is to be understood that, in some embodiments, the value, feature, or characteristic may be specified without approximation. For example, where qualifiers such as "substantially," "about" or "approximately" are used, these terms include within their scope the qualified words in the absence of their qualifiers. Accordingly, wherever a term of approximation (e.g., "substantially" or the like) with respect to a feature has been recited herein, this disclosure effectively discloses that same feature without that term of approximation.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the preceding claims up to and including claim [x]," where the bracketed term "[x]" is replaced with the number of the most recently recited independent claim. For example, for the first claim set that begins with independent claim 1, claim 3 can depend from either of claims 1 and 2, with these separate dependencies yielding two distinct embodiments; claim 4 can depend from any one of claims 1, 2, or 3, with these separate dependencies yielding three distinct embodiments; claim 5 can depend from any one of claims 1, 2, 3, or 4, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed in accordance with 35 U.S.C. § 112(f). Embodiments of the invention in which an exclusive property or privilege is claimed are defined as follows.

The invention claimed is:

1. An aircraft comprising:
 a frame;
 a plurality of electrical rotors coupled to the frame;
 a control system physically coupled to the frame and communicatively coupled with each of the plurality of electrical rotors, wherein the control system is configured to control a speed of each electrical rotor on an individual basis to control a direction of flight of the aircraft; and
 an engine coupled to the frame, the engine being configured to combust a combustible fuel to generate:
 thrust, and
 electrical energy,
 wherein the engine is pivotally coupled to the frame, and wherein the control system is configured to adjust an angle of the engine relative to the frame.

2. The aircraft of claim 1, wherein each rotor is pivotally mounted to the frame and defines an axis of rotation, and wherein the control system is configured to adjust an angle of the axis of rotation of each rotor relative to the frame.

3. The aircraft of claim 1, further comprising a plurality of wings coupled to the frame, wherein the control system is configured to rotate the wings relative to the frame.

4. The aircraft of claim 3, wherein the plurality of wings comprise control surfaces, and wherein the control system is configured to control movement of the control surfaces.

5. The aircraft of claim 1, further comprising a plurality of wings pivotally coupled to the frame, wherein the wings are free to rotate relative to the frame in response to airflow relative to the aircraft.

6. The aircraft of claim 1, further comprising a plurality of wings coupled to a respective plurality of wing spars, and wherein each rotor is positioned on a respective one of the wing spars at a position that is distal to the wing that is coupled to that wing spar.

7. The aircraft of claim 1, further comprising a fuel bladder physically coupled to the frame and fluidly coupled to the engine.

8. An aircraft comprising:
a frame;
a plurality of wings coupled to the frame;
a respective plurality of electrical rotors pivotally coupled to the frame at positions distal to the plurality of wings, each electrical rotor defining an axis of rotation that is adjustable relative to the frame;
a control system physically coupled to the frame and communicatively coupled with each of the plurality of electrical rotors; and
an engine coupled to the frame, the engine being configured to combust a combustible fuel to generate;
thrust, or
electrical energy,
wherein the engine is pivotally coupled to the frame, and wherein the control system is configured to adjust an angle of the engine relative to the frame.

9. The aircraft of claim 8, wherein the control system is configured to control a speed of each electrical rotor on an individual basis to control a direction of flight of the aircraft.

10. The aircraft of claim 8 or 9, wherein the control system is configured to adjust an angle of the axis of rotation of each rotor relative to the frame.

11. The aircraft of claim 8 or 10, wherein the control system is configured to rotate the wings relative to the frame.

12. The aircraft of claim 11, wherein the plurality of wings comprise control surfaces, and wherein the control system is configured to control movement of the control surfaces.

13. The aircraft of claim 8 or 10, wherein the wings are free to rotate relative to the frame in response to airflow relative to the aircraft.

14. The aircraft of claim 8 or 10, wherein the plurality of wings are coupled to a respective plurality of wing spars, and wherein each rotor is positioned on a respective one of the wing spars at a position that is distal to the wing that is coupled to that wing spar.

15. An aircraft comprising:
a frame;
a plurality of electrical rotors pivotally coupled to the frame;
a plurality of wings pivotally coupled to the frame, the plurality of wings being configured to rotate relative to the frame independently of the rotors; and
an engine coupled to the frame, the engine being configured to combust a combustible fuel to generate;
thrust, or
electrical energy; and
a control system physically coupled to the frame and communicatively coupled with each of the plurality of electrical rotors, each of the plurality of wings, and the engine to individually control angles of each electrical rotor, each wing, and the engine relative to the frame.

16. The aircraft of claim 15, wherein the control system is configured to control a speed of each electrical rotor on an individual basis to control a direction of flight of the aircraft.

17. The aircraft of claim 15, wherein the plurality of wings comprise control surfaces, and wherein the control system is configured to rotate the plurality of rotors, the plurality of wings, and the engine from a first orientation, in which the control system controls a speed of each electrical rotor on an individual basis to control flight of the aircraft, to a second orientation, in which the control system controls the control surfaces of the wings to control flight of the aircraft.

* * * * *